United States Patent [19]
Iida et al.

[11] Patent Number: 5,446,835
[45] Date of Patent: Aug. 29, 1995

[54] HIGH-SPEED PICKING SYSTEM FOR STACKED PARTS

[75] Inventors: Yasuhiro Iida; Yasuo Hibi, both of Nagoya; Toshio Kato, Toyoake, all of Japan; Hiroshi Harada, Bloom Field, Mich.

[73] Assignee: Nippondenso Co., Ltd., Kariya, Japan

[21] Appl. No.: 968,065

[22] Filed: Oct. 29, 1992

[30] Foreign Application Priority Data

| Oct. 30, 1991 | [JP] | Japan | 3-313974 |
| Oct. 30, 1991 | [JP] | Japan | 3-313975 |
| Oct. 30, 1991 | [JP] | Japan | 3-313976 |
| Nov. 8, 1991 | [JP] | Japan | 3-320994 |

[51] Int. Cl.⁶ .................................. G06K 9/00
[52] U.S. Cl. ............................................ 395/133
[58] Field of Search .......... 395/134, 155, 161, 133; 364/200 MS File, 900 MS File, 472, 473; 382/25, 26, 27, 28

[56] References Cited

U.S. PATENT DOCUMENTS

5,260,009 11/1993 Penn ............................. 264/40.1

FOREIGN PATENT DOCUMENTS

0178329 4/1986 European Pat. Off.
59-198307 11/1984 Japan.
63-163975 7/1988 Japan.

OTHER PUBLICATIONS

"Image Preprocessor of Model-Based Vision System for Assembly Robots" by H. Moribe et al; pp., 1-6.

*Primary Examiner*—Phu K. Nguyen
*Attorney, Agent, or Firm*—Cushman, Darby & Cushman

[57] ABSTRACT

A stacked-part high-speed picking system for extracting a plurality of constitutive line segments from a two-dimensional image corresponding to stacked parts so as to recognize the parts on the basis of the constitutive line segments, thereby allowing parts to be picked up by a robot. The picking system has a first storage unit that stores a plurality of collative models. Each collative model is based upon data that specifies a configuration when a plurality of specific portions of the parts are disposed in one of a plurality of basic positions. The picking system also has a second storage unit that stores information relating to the robot so as to allow the robot to pick up specific portions of the parts. The picking system detects as one of the plurality of specific portions a portion of the two-dimensional image, which is recognized through a collation with the plurality of collative models, and determines a position of the detected specific portion. A command signal is supplied to the robot, when the robot has a plurality of hands, so as to select one of the plurality of hands in accordance with the detected specific portion and position the hand at the determined position.

10 Claims, 23 Drawing Sheets

FIG. 4
| | STATE 1 | STATE 2 | STATE 3 |
|---|---|---|---|
| WORK CONFIGURATION WHEN VIEWED FROM A POSITION ABOVE TRAY | 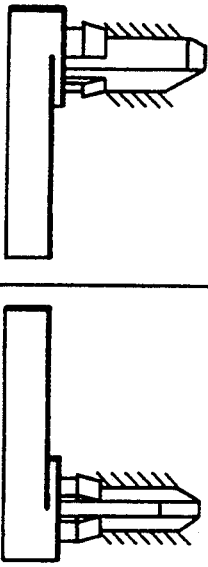 |  |  |
| COLLATIVE MODEL | $\ell_1$, $m_1$ | $\ell_2$, $\ell_3$, $m_2$ | $\phi C$ |
| EXISTANCE RATE | 35% | 23% | 15% |

FIG. 5

| BASIC STEP \ ARTICLE CONFIGURATION | CIRCLE | PARALLEL | PIN |
|---|---|---|---|
| | | PARTS | |
| LIMITATION & RECOGNITION OF SPECIFIC PORTION (SIMPLIFICATION OF IMAGE PROCESSING) | | | |
| PICKING OF ONE PART (ONE DEGREE OF FREEDOM) | | | |

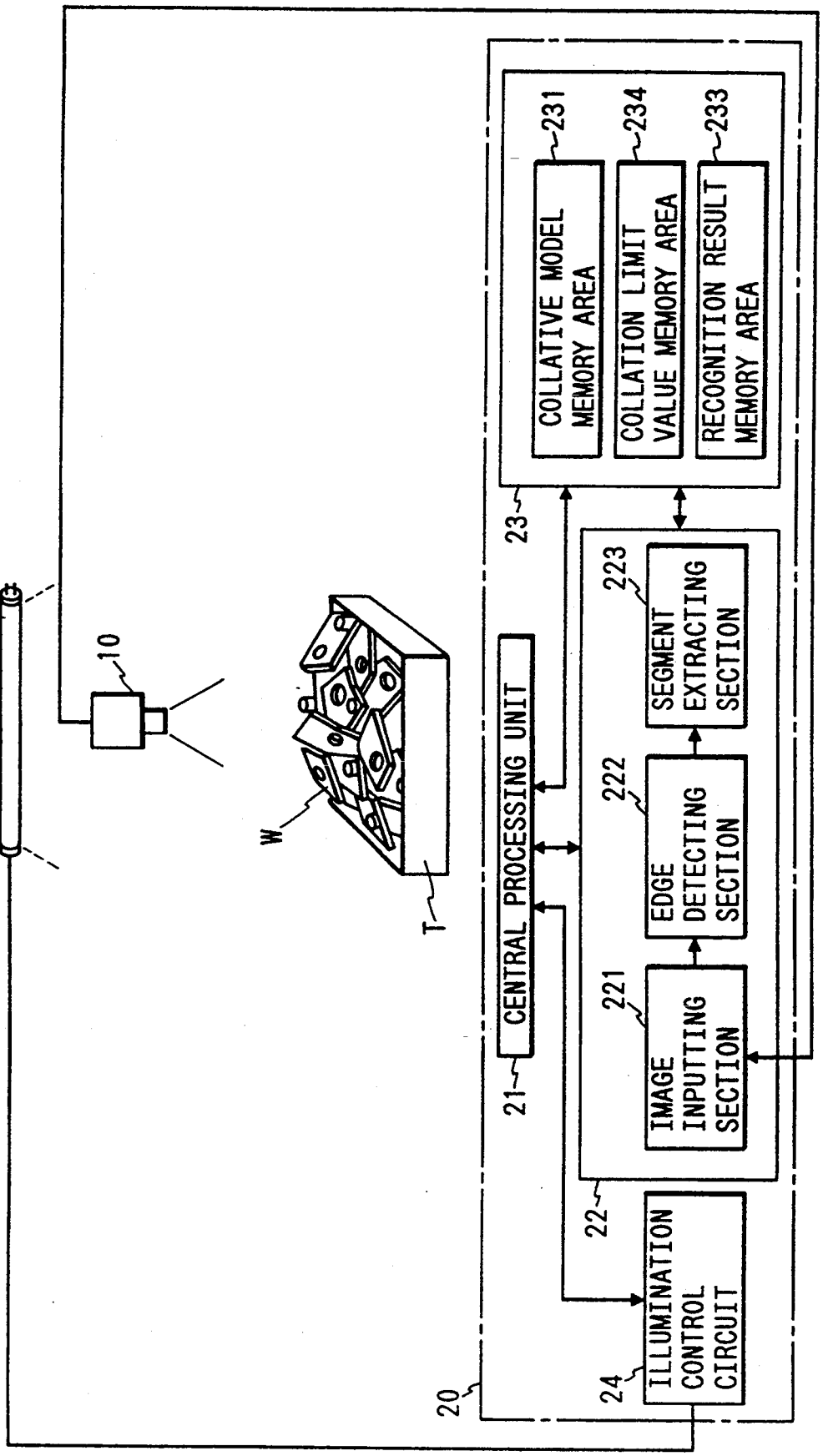

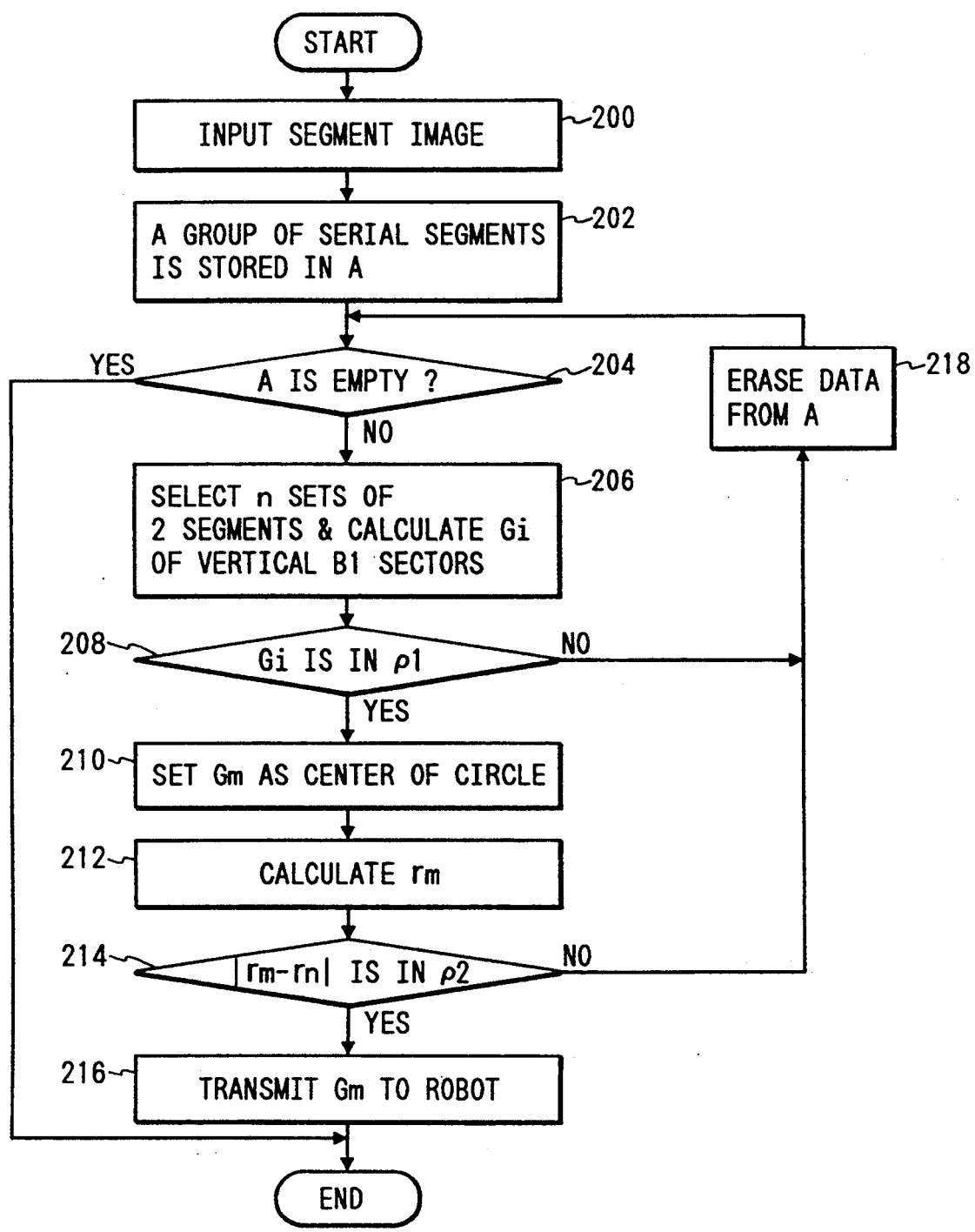

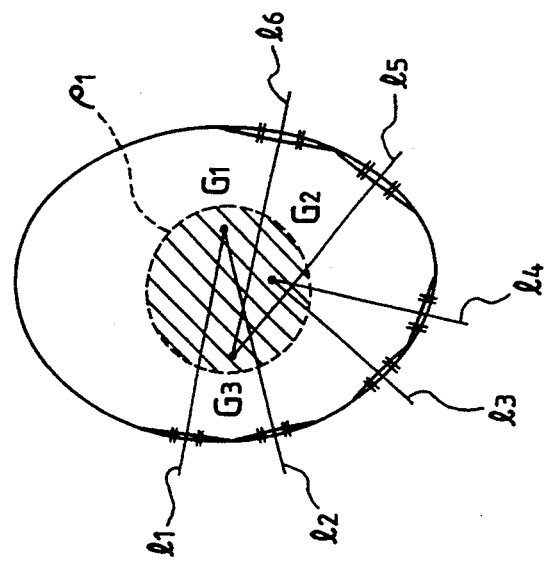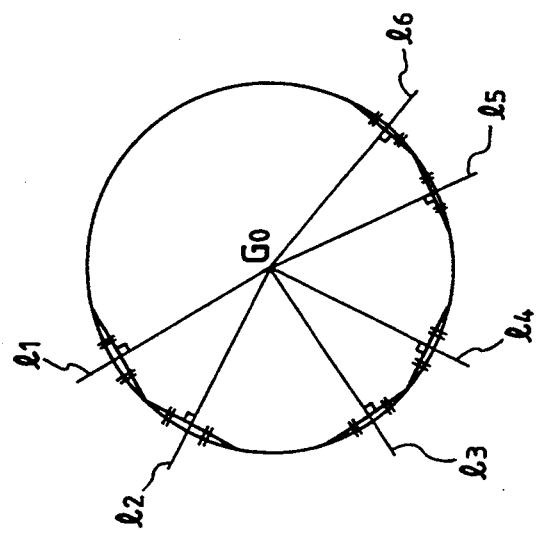

CIRCLE RECOGNITION
$\bar{x} = 4.8$

ELLIPSE RECOGNITION
$\bar{x} = 3.2$

FIG. 18

| ARTICLE / CONFIGURATION<br>BASIC STEP | CIRCLE | PARALLEL | PIN |
|---|---|---|---|
| LIMITATION & RECOGNITION OF SPECIFIC PORTION | | | |
| PICKING | | | |
| ADJUST POSITION OF PART | | | |

(PARTS)

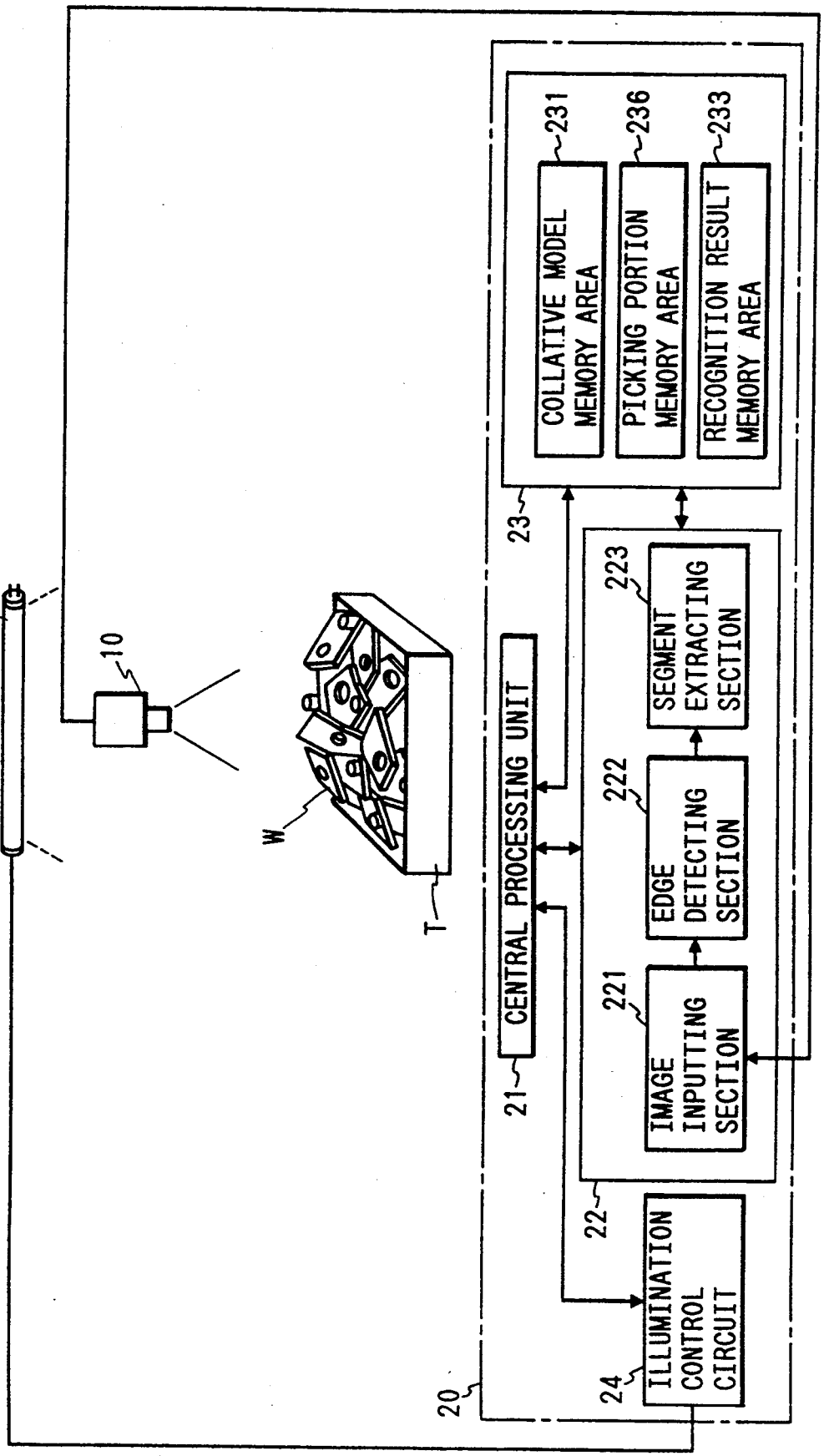

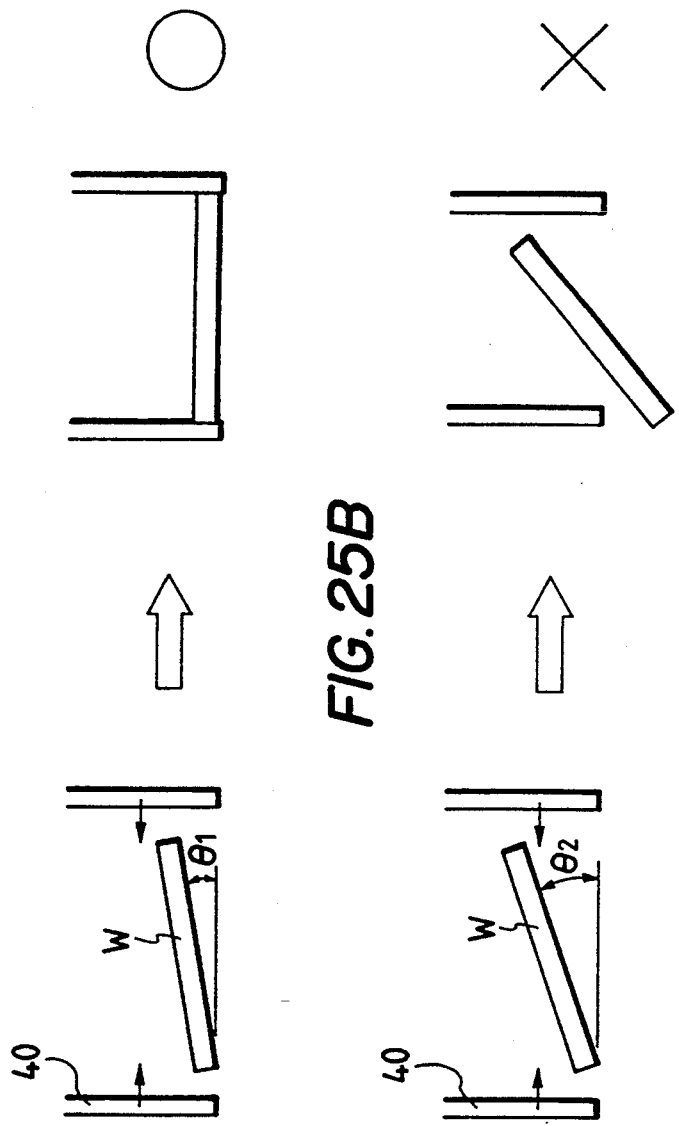

HIGH-SPEED PICKING SYSTEM FOR STACKED PARTS

BACKGROUND OF THE INVENTION

The present invention relates to high-speed picking systems for holding stacked or heaped parts within a tray.

Conventionally, for picking a part from a plurality of parts, a gray scale (variable density) image data is produced on the basis of a video signal, which is obtained through the use of a camera. The image data is then differentiated so as to trace the ridge line of an edge within the image data so as to extract a border line and thereby obtaining a line segment image. Further, the pattern-matching is then made between the line segment image and a collative model, which corresponds to the configuration of a part to be held. By this method, the uppermost part of the plurality of parts. However, parts for general industrial articles are normally stacked one above another within a tray or the like so that each of the stacked parts may take a greatly inclined state with respect to the horizontal plane. Thus, in this situation, it is difficult to recognize and pick up one of the stacked parts on the basis of the collative model. The difficulty arises because the collative model was formed under the condition that the uppermost-positioned part is not in the inclined state.

SUMMARY OF THE INVENTION

It is therefore an object of the present invention to provide a picking system which is capable of recognizing and picking up at least one of the stacked parts at a high speed.

A stacked-part high-speed picking system according to an embodiment of the present invention has means for storing a plurality of collative models, each based upon data specifying a configuration when a plurality of specific portions of the stacked parts are disposed in one of a plurality of basic positions. The plurality of collative models represent the plurality of specific portions so as to allow recognition of the plurality of specific portions in the two-dimensional image. Each of the plurality of specific portions has a simple shape, which allows the stacked parts to be picked up by a robot.

This embodiment of the system also has means for storing a collation limit value which is based upon an inclination limit angle of the plurality of specific portions relative to each of the basic position. The inclination limit angle defines a range that allows a selected one of the plurality of specific portions to be picked up by the robot and indicates an allowable non-coincidence range between the selected specific portion and a corresponding one of the collative models.

Also included in this embodiment of the system is a specific portion detecting means for detecting, as the selected specific portion, a portion of the two-dimensional image which is within the allowable non-coincidence range and which is recognized in accordance with the collative models. Means for determining a position of the detected selected specific portion is also included. Finally, this embodiment of the system has command means for positioning the robot at the determined position of the detected selected specific portion so as to allow the robot to pick up the selected specific portion.

In another embodiment, a stacked-part high-speed picking system has means for storing a plurality of collative models, each based upon data specifying a configuration when a specific portion of the stacked parts are disposed in one of a plurality of basic positions. The collative models represent the specific portion so as to allow recognition of the specific portion in a two-dimensional image. The specific portion has a simple shape, which allow for visual recognition of the specific portion.

This embodiment of the system also has collation limit value storage means for storing a collation limit value, which is based upon an inclination limit angle of the specific portion relative to each of the basic positions. The inclination limit angle defines a range that allows the specific portion to be picked up by a robot. The inclination limit angle also indicates an allowable non-coincidence range between the specific portion and a corresponding one of the collative models.

Also included in this embodiment of the system is means for storing a positional collative models, which is based upon data specifying a configuration when the stacked parts are in a predetermined position. The positional collative model set specifies a position of the specific portion. This embodiment of the system has specific portion detecting means for detecting, as the specific portion, a portion of the two-dimensional image which is within the non-coincidence range.

Position determining means is also included in this embodiment of the system for determining a position of the detected portion of the two-dimensional image. This system contains command means for positioning the robot at the position determined by the position determining means so as to allow the robot to pick up one of the stacked parts. Also included is means for calculating, when the robot picks up only one of the stacked parts, a positional correction amount indicative of a deviation between a position of the picked up stacked parts and the positional collative model. Finally, this embodiment of the system has command means for correcting, based upon the positional correction amount, the determined position of the detected specific portion.

BRIEF DESCRIPTION OF THE DRAWINGS

The object and features of the present invention will become more readily apparent from the following detailed description of the preferred embodiments taken in conjunction with the accompanying drawings in which:

FIG. 4 is an illustration of states of stacked parts within a tray;

FIG. 5 shows the basic steps of a picking operation for stacked multi-shaped parts;

FIG. 7 is a block diagram showing an arrangement of a principal portion of the high-speed picking system depicted in FIG. 6;

FIG. 8 is a flow chart showing a processing procedure of a central processing unit to be used in the system depicted in FIG. 6;

FIGS. 9A and 9B are illustrations for describing methods of the centers of circles and ellipses;

FIG. 18 shows the basic steps of a picking operation for stacked multi-shaped parts;

FIG. 21 is a block diagram showing an arrangement of a principal portion of a high-speed picking system according to an embodiment of this invention;

FIGS. 25A to 25B show the pickings of allowable and non-allowable positions of works.

DETAILED DESCRIPTION OF THE INVENTION

Figure 1:
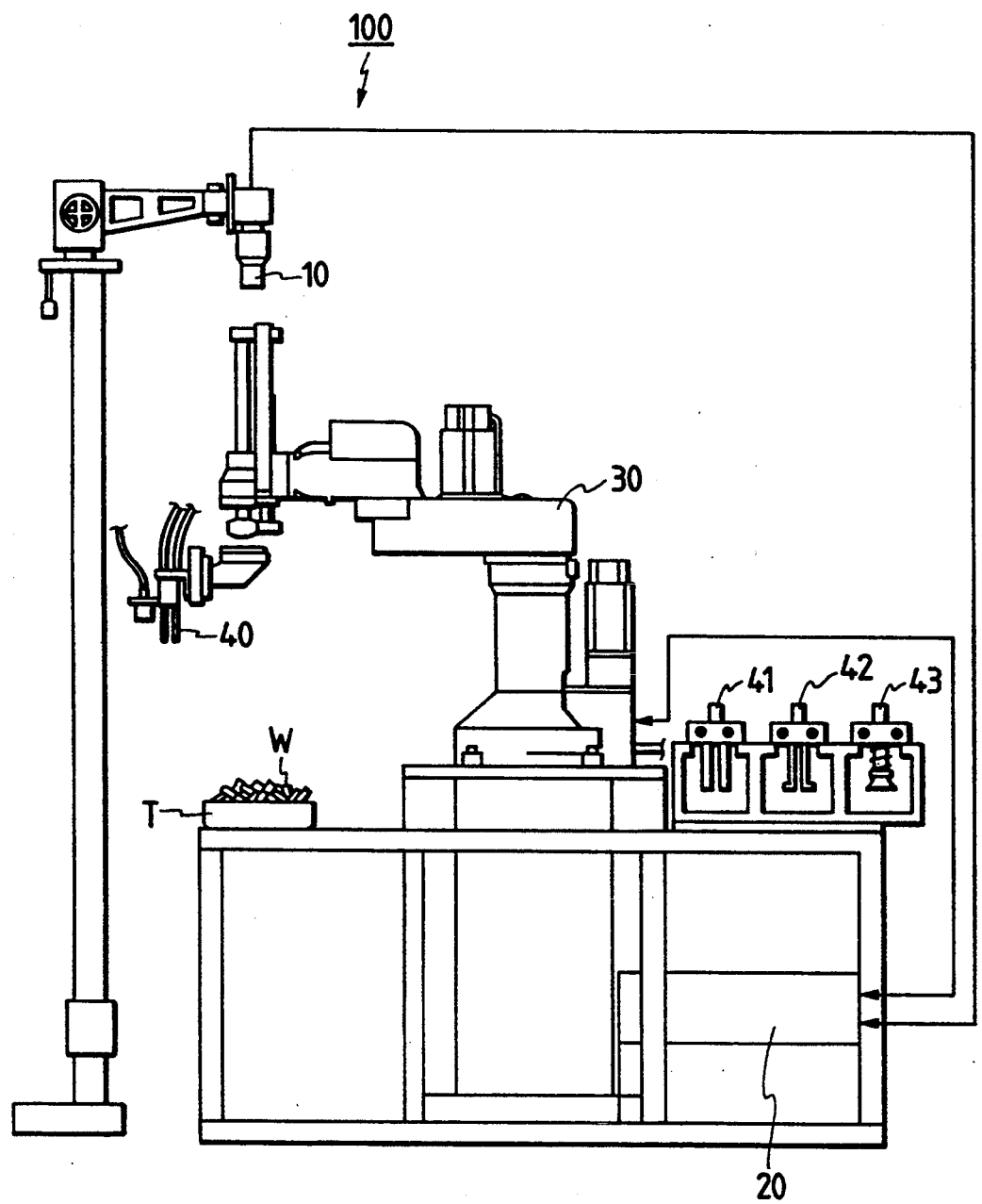
FIG. 1 shows an entire arrangement of a high-speed picking system according to an embodiment of this invention.
Figure 2:
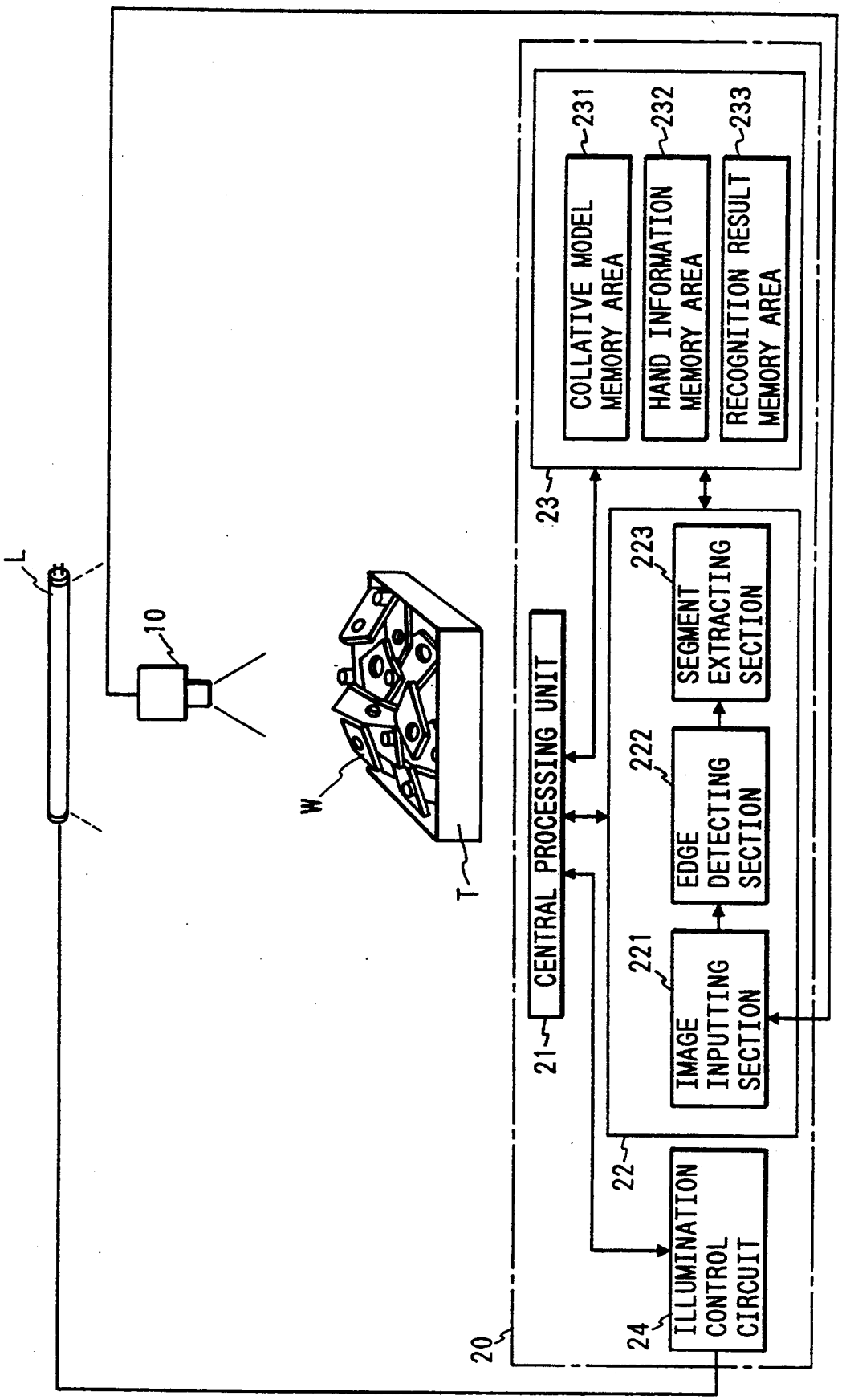
FIG. 2 is a block diagram showing an arrangement of a principal portion of the high-speed picking system depicted in FIG. 1.

Referring now to FIGS. 1 and 2, a description will be made hereinbelow in terms of a first embodiment of this invention. FIG. 1 is an illustration of the entire arrangement of a high-speed picking system according to the first embodiment and FIG. 2 is a block diagram showing an arrangement of a principal portion of the high-speed picking system. In FIG. 1, the high-speed picking system, designated at numeral 100, principally comprises an image inputting camera 10, an object recognizing apparatus 20, a picking robot 30 including a hand 40 having at its tip portion a finger to hold one (work) W from stacked parts, and exchange hands 41, 42 and 43. The exchange hands 40 to 43 are selectively mounted on the picking robot 30 in correspondence with specific portions of the works W. For example, the hand 40, mounted on the picking robot 40 in the illustration, is for holding a word W through a specific portion with a simple configuration such as a circular hole of the work W, the hand 41 is for holding a work W through the external form, the hand 42 is for holding a work W by insertion into a hole of the work W and hooking, and the hand 43 is for holding a work W by absorbing a flat portion of the work W. On a working table there is provided a tray T in which works W are encased in a stacked state.

In FIG. 2, the image inputting camera 10 is positioned above the tray T encasing the stacked works W, and further an illuminating device L is provided so as to evenly illuminate the works W from a position above the center of a tray T. The object recognizing apparatus 20 comprises a central processing unit 21 for performing data processings such as collation and decision, and an image processing unit 22 for performing data processings such as processing a video signal from the image inputting camera 10 to detect the border line of an object, to be detected, to extract constitutive line segments constituting the border line or obtaining a combined edge image. Also included in the object recognizing apparatus 20 are a storage unit 23 for storing data relating to the collative model and data relating to the object, and an illumination control circuit 24.

The image processing unit 22 includes an image inputting section 221 for sampling the video signal from the image inputting camera 10 to digitize the gray scale levels to produce a gray scale image data, an edge detecting section 222 for obtaining a lightness gradient from the gray scale image data by a differential calculation to produce an edge image data indicative of edges of the object image, and a segment extracting section 223 for tracing the border line on the basis of the edge image data to extract the constitutive line segments of the border line to produce data relating to the positions of the constitutive line segments. Further, the storage unit 23 is constructed with a RAM and others having a collative model memory area 231 which acts as a collative model storage means to store a plurality of collative models set in advance on the basis of the data specifying a configuration when a plurality of specific portions of a work W take basic positions, a hand information memory area 232 which acts as a hand information storage means to store a plurality of hand information for allowing the plurality of specific portions to be respectively held, and a recognition result memory area 233 for storing the collation results of the line segment image corresponding; to a number of works within the tray T.

Figure 3:
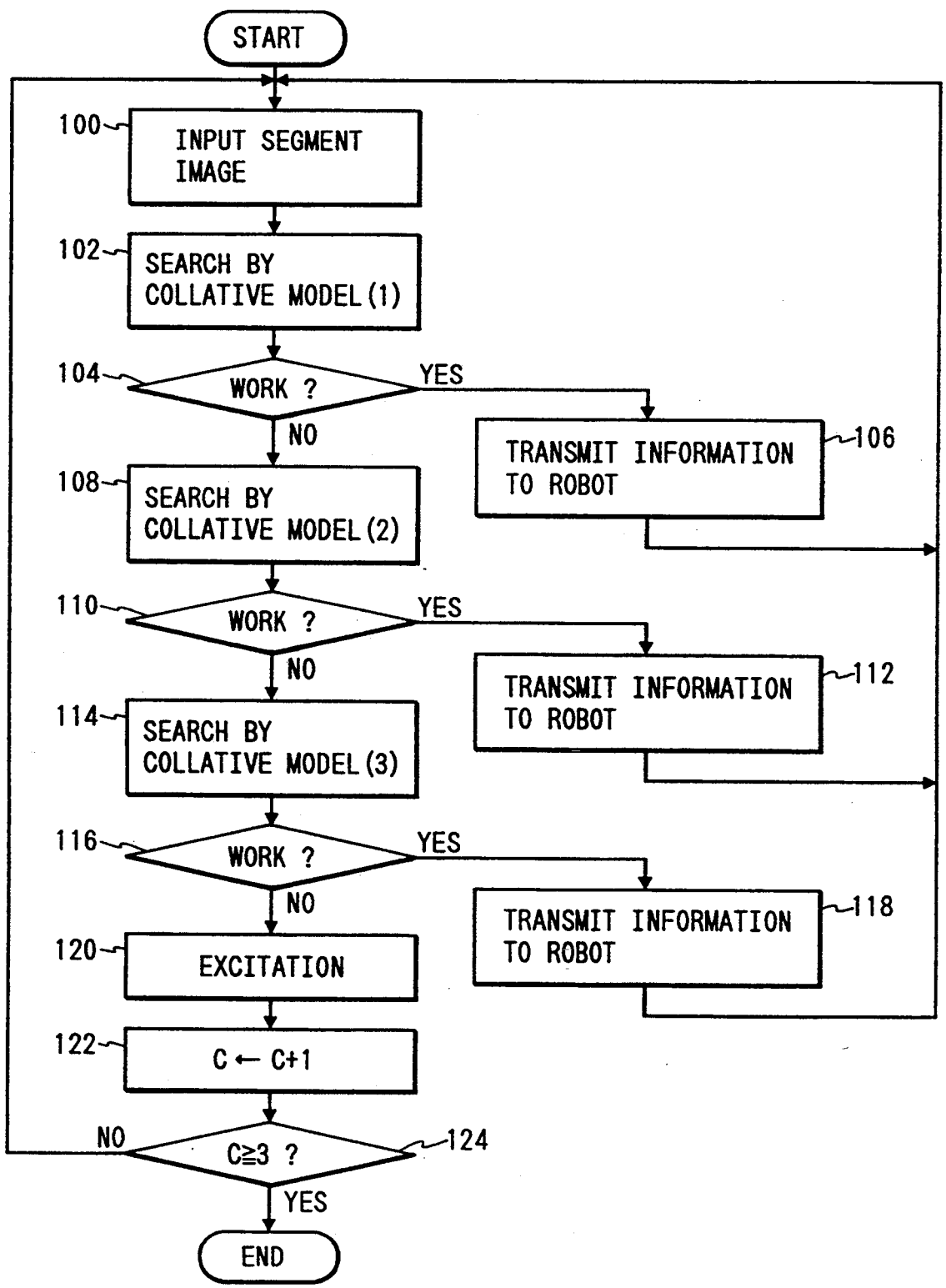
FIG. 3 is a flow chart showing a processing procedure of a central processing unit to be used in the system depicted in FIG. 2.

Secondly, a description will be made hereinbelow with reference to a flow chart: of FIG. 3 in terms of a processing procedure of the object recognizing apparatus 20 after the input of the video signal of a number of stacked works W from the image inputting camera 10 and the extraction of the constitutive line segments. Here, for example, in the case of the ridge lines of a parallel (straight) pin indicated by a hatching as State 1 in FIG. 4, the specific portion is checked in accordance with a collative model (1) indicative of "line segments parallel to each other and equal in length to each other", in the case of the ridge lines of a parallel pin indicated by a hatching as State 2 in FIG. 4, the specific portion is checked in accordance with a collative model (2) indicative of "line segments parallel to each other and different in length from each other", and in the case of the circular hole indicated by a hatching as State 3 in FIG. 4, the specific portion is checked in accordance with a collative model (3) indicative of "circle".

First, the illuminating device L is turned on by the illumination control circuit 24 and the video signal due to the image inputting camera 10 is inputted to the image inputting section 221 of the image processing unit 22. The image inputting section 221 samples the video signal and converts it into a digital signal to produce a gray scale image. This gray scale image data is inputted to the edge detecting section 222 so as to be differentiated to produce an edge image. This edge image data is inputted to the segment extracting section 223 to extract the border line of the object by tracing the ridge lines. Further, the border line is approximated by a kinked line, a circle and others, thereby obtaining a line segment image.

In a step 100, the central processing unit 21 inputs the line segment image from the image processing unit 22. In a step 102, a serial line segment group is extracted from the inputted line segment image and searched in accordance with the collative model (1) for the work W specific portion "line segments parallel (distance ml) and equal in length (I1). Here, for example, the search due to a plurality of collative models is effected in the order of decreasing the abundance rate of States within the tray T shown in FIG. 4. Further, if we know the picking success probability of each State beforehand, it is also appropriate that the search due to the collative models is effected in the order of decreasing the picking success probability.

Then, a step 104 is executed so as to check whether the target work W is found by the search due to the collative model (1). If the answer of the step 104 is affirmative, a step 106 follows to supply information such as the position (directional central coordinate position with a direction) of the specific portion of the work W searched by the collative model (1) and the hand (hand number) capable of holding the specific portion thereof to the picking robot 30 side. On the other hand, if the answer of the step 104 is negative, a step 108 follows to extract a serial line segment group from the inputted line segment image so as to perform the search on the basis of the collative model (2) corresponding to the work W specific portion "line segments parallel (distance m2) and different in length (L2, L3)".

After the execution of the step 108, a step 110 is executed to check whether the target work W is found by the search due to the collative model (2). If the answer of the step 110 is affirmative, a step 112 is executed to supply information such as the position (directional central coordinate position with a direction) of the specific portion of the work W searched by the collative model (2) and the hand (hand number) capable of holding the specific portion thereof to the picking robot 30 side. On the other hand, if the answer of the step 110 is negative, a step 114 follows to extract a serial line segment group from the inputted line segment image so as to perform the search on the basis of the collative model (3) corresponding to the work W specific portion "cycle ($\phi$c)".

Here, although the collative models (1), (2) and (3) in the above-mentioned steps 102, 108 and 114 are predetermined on the basis of the data specifying the configurations when the specific portions of the work W take the basic position, the coincidental range in the collation can be enlarged for the search by using the limit angle which is capable of holding the work W even if the work W takes an inclined state.

Thereafter, a step 116 is executed to check whether the target work W is found by the search due to the collative model (3). If the answer of the step 116 is affirmative, a step 118 follows to to supply information such as the position (directional central coordinate position with a direction) of the specific portion of the work W searched by the collative model (3) and the hand (hand number) capable of holding the specific portion thereof to the picking robot 30 side. On the other hand, if the answer of the step 116 is negative, a step 120 follows to output an excitation command to an excitation device to excite the tray T so as to change the states of the stacked works W at the time of the next input of the line segment image to increase the probability that the search is allowed by the collative models.

Secondly, a step 122 is executed to count the number of times of the excitation. This excitation count is initially set to 0 in the program and increased whenever the search due to each collative model ends in failure. Further, in a step 124, it is checked whether the excitation count $C \geq 3$. That is, in the case that the states of the stacked works W do not change irrespective of 3 excitations so that the 3 searches due to all the collative models end in failure, a decision is made such that the work W within the tray T is gone or the existing states of the works W are very bad so as not to be suitable for a further execution of the search, thereby terminating this program.

Here, the steps 102, 108 and 114 act as a specific portion detecting means, the steps 104, 110 and 116 act as a position determining means, and the steps 106, 112 and 118 act as a command means.

By the execution of the above-described program, a part recognized by a plurality of collative models formed in correspondence with a plurality of specific portions of the part is picked up by any one of the hand 40 of the picking robot 30 and the exchange hands 41 to 43. Thus, the picking operations to be effected by the plurality of hands corresponding to the plurality of portions of the part can extremely improve the picking success probability of the parts of the picking robot 30. Although in the above-described embodiment the hands of the picking robot one-to-one-correspond to the specific portion searching collative models, when the parts can be picked up by the same hand even if the specific portions are different from each other, for example, in the case that the specific portions have flat configurations different in width, it is not always required to prepare a plurality of hands. Further, although in the above-described embodiment the circle or a parallel portion are selected as the plurality of specific portions of the part, it is also possible to select a long hole, a straight line, an arc, a corner and others as the specific portions. In addition, it is also appropriate to select a hallmark, a printed mark and others as the specific portions. In this case, a portion of the outside configuration decided on the basis of the recognized position of the specific portion may be selected as the holding position.

FIG. 5 shows the basic steps for the high-speed picking operation from stacked parts having a number of shapes.

Moreover, although in the above-described embodiment the picking operation is effected on the assumption that one part has some specific portions to be held, this system is also applicable to the case that different kinds of parts are mixedly encased within the tray. In this case, with the specific portion of each part being limited and recognized, it is possible to surely hold the parts by the hands suitable for the respective specific portions. Further, although the objects to be held in accordance with this invention are stacked parts, this invention is also applicable to one part independently placed on a plane, several parts scattered, and parts separately placed within a tray which is divided by partitions.

According to this invention, as described above, a high-speed picking system stores a plurality of collative models predetermined on the basis of data specifying the configurations when a plurality of specific portions having simple shapes to allow holding parts take the basic positions and further stores information for a plurality of hands of a robot which can hold the plurality of specific portions so that a portion of a two-dimensional image collated with the plurality of collative models and recognized is detected as one of the plurality of specific portions to determine the position of the detected specific portion and one of the plurality of hands is selected and positioned with respect to the determined position of the specific portion to pick up the specific portion. Thus, if at least one of the plurality of specific portions of the part is collated with the collative model and recognized, the hand of the robot suitable for holding the specific portion can be selected and positioned with respect to the recognized specific portion to pick up the part. The collation with the collative models corresponding to the plurality of specific portions of the part can improve the probability that the specific portions are recognized. In addition, since the picking information such as the position corresponding to the recognized specific portion of the part and the hand selection are supplied to the robot side, it is possible to considerably improve the picking success probability that the part is held by the hand of the robot.

Figure 6:
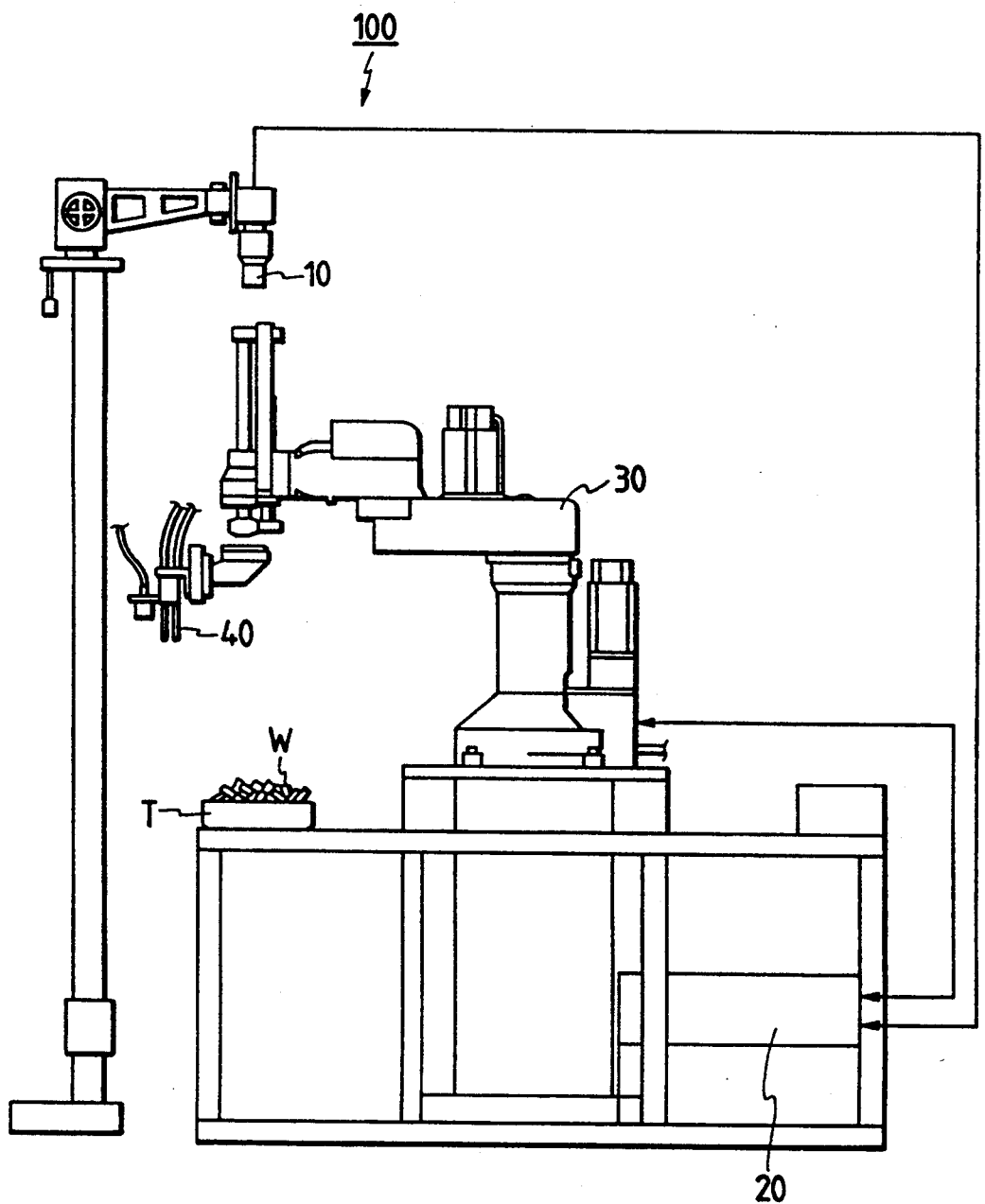
FIG. 6 shows the entire arrangement of a high-speed picking system according to another embodiment of this invention.

A second embodiment of this invention will be described hereinbelow with reference to FIGS. 6 and 7. FIG. 6 shows the entire arrangement of a high-speed picking system according to the second embodiment of this invention and FIG. 7 shows an arrangement of a principal portion of the FIG. 6 high-speed picking system, where parts corresponding to those in FIGS. 1 and 2 are marked with the same numerals and characters and the description thereof will be omitted for brevity. In FIGS. 6 and 7, the high-speed picking system basically comprises an image inputting camera 10, an object recognizing apparatus 20 and a picking robot 30. The object recognizing apparatus 20 similarly comprises a central processing unit 21, an image processing unit 22, a storage unit 23 and an illuminating control circuit 24. The image processing unit 22 similarly includes an image inputting section 221, an edge detecting section 222 and a segment extracting section 223. On the other hand, the storage unit 23 is constructed with RAMs or others and arranged to includes at least a collative model memory area 231 which acts as a collative model storage means to store a collative model set in advance on the basis of data specifying the configuration when a specific portion of a work W takes the basic position, a collation limit value memory area 234 which acts as a collation limit value storage means to store the collation lime value indicative of the non-coincidence-allowable range between the specific portion and the collative model, and a recognition result memory area 233 which stores the collation result of a line segment image corresponding to a number of stacked works W within a tray T.

That is, according to this embodiment, the collative model and the collation limit value (threshold value) are stored, the collative model being set in advance on the basis of the data specifying a configuration when a simply shaped specific portion takes the basic position and the collation limit value being indicative of an allowable non-coincidence range between the specific portion and the collative model. Further, one portion which is within the non-coincidence range determined by the collation limit value and which is recognized from the two-dimensional image with respect to the collative model is detected as the specific portion and the position of the detected specific portion is determined and a command is transmitted to the robot side so that the hand is placed at that position to pick up the specific portion.

Secondly, a description will be made hereinbelow with reference to a flow chart of FIG. 8 in terms of a processing procedure of the object recognizing apparatus 20 after the input of the video signal of a number of stacked works W from the image inputting camera 10 and the extraction of constitutive line segments in the case that, for example, a circle is selected as a specific portion from the various constitutive line segments and collated with a collative mode "circle".

First, the illuminating device L is turned on by the illumination control circuit 24 and the video signal due to the image inputting camera 10 is inputted to the image inputting section 221 of the image processing unit 22. The image inputting section 221 samples the video signal and converts it into a digital signal to produce a gray scale image. This gray scale image data is inputted to the edge detecting section 222 so as to be differentiated to produce an edge image. This edge image data is inputted to the segment extracting section 223 to extract the border line of the object by tracing the ridge lines. Further, the border line is approximated by a kinked line, a circle and others, thereby obtaining a line segment image.

In a step 200, the central processing unit 21 inputs the line segment image from the image processing unit 22. In a step 202, a serial line segment group of the inputted line segment image are stored in a storage area A within the central processing unit 1. Then, a step 204 is executed so as to check whether the storage area A is empty, that is, whether the serial line segment group which is the collative object remains within the storage area A. In the initial execution cycle, the storage area A is not empty in the case that the serial line segment group is successfully extracted from the inputted line segment image, the operation naturally advances to a step 206. In the step 206, n sets of two segments are selected from the serial line segment group within the storage area A so as to calculate the intersections Gi ($i=1, 2, \ldots, n$) of the vertical bisectors thereof. FIGS. 9A and 9B shows calculating methods of the centers of a circle and an ellipse. As illustrated in FIG. 9A, if the serial line segment group is close to a circle, the coordinates of the intersections of the vertical bisectors of the n sets of two line segments (l1 and l2, l3 and l4, l5 and l6, . . . ) are substantially coincident with each other so as to be G0. On the other hand, if the serial line segment group forms an ellipse as illustrated in FIG. 9B, the coordinates of the intersections of the vertical bisectors of the n sets of two line segments (l1 and l2, l3 and l4, l5 and l6, . . . ) are not coincident with each other so as to be G1, G2, G3, . . . , Gn.

Returning again to FIG. 8, a step 208 is then executed to check whether all the maximum distance values between the optional two points of the intersections Gi ($i=1, 2, \ldots, n$) obtained in the step 206 are in a predetermined tolerance (permissible range) $\sigma 1$ which is a first collation limit value of the collative model. That is, the serial line segment group is essentially checked as to whether being a circle. In the FIG. 9B case, the aforementioned tolerance $\sigma 1$ is the inside portion (hatched portion) of a circle indicated by a dotted line and is indicative of the collation limit values which allow the collation relative to the collative model in the case that a circular hole which is a specific portion of a work W is inclined to be an ellipse. In the step 208, all the intersections G1 (i=1, 2, ..., n) are within the tolerance σ1, a step 210 follows to calculate the average (G1, G2, ..., Gn)/n of the intersections Gi (i=1, 2, ..., n) so as to obtain the central coordinate Gm.

Thereafter, a step 212 is executed to calculate the average of the distances between the central coordinate Gm obtained in the step 210 and the respective line segments selected in the step 206 so as to obtain a radius $r_m$. Then, a step 214 follows to check whether the deviation $|r_m - r_o|$ relative to the radius $r_o$ of the circle of the collative model stored in the collative model memory area 231 of the storage unit 23 is in a predetermined tolerance σ2.

Figure 10A:
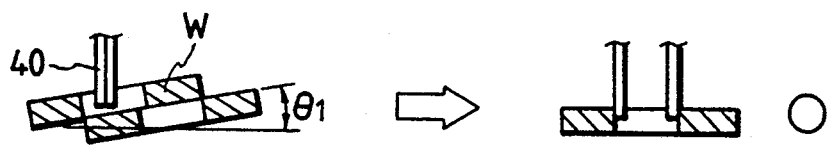
FIGS. 10A and 10B are illustrations for describing the picking of allowable and non-allowable works.
Figure 10B:
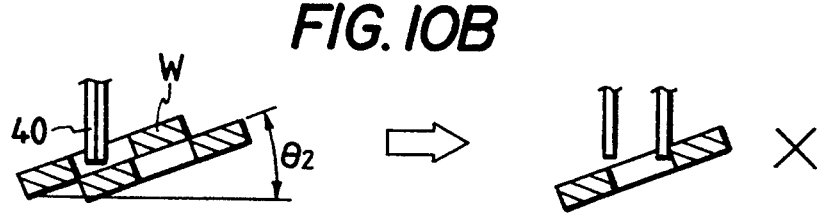
Figure 11:
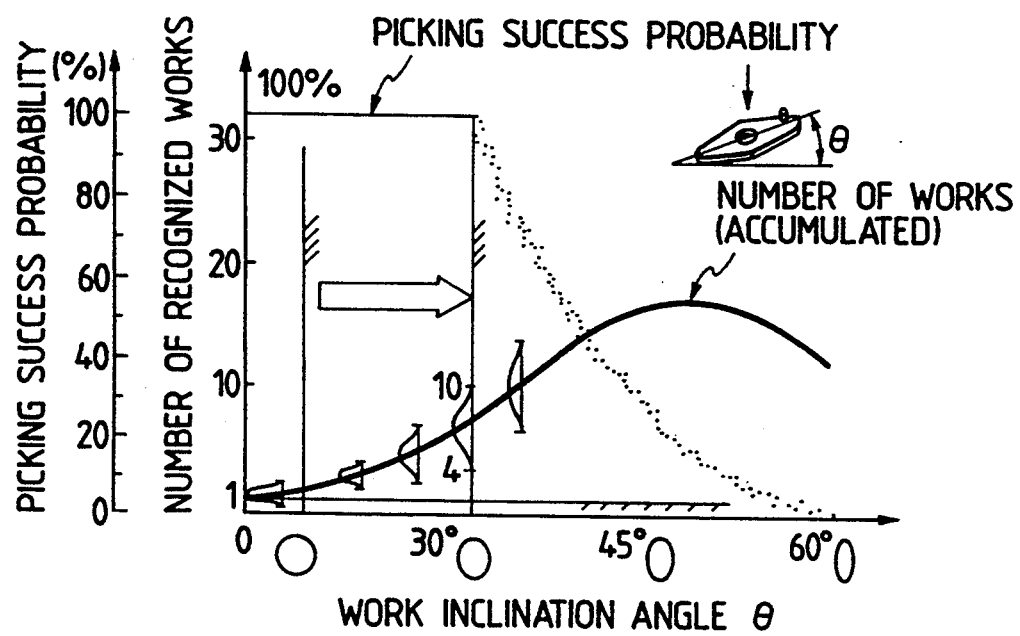
FIG. 11 is a graphic illustration for describing the picking success probability relative to a work inclination angle.

Here, FIGS. 10A and 10B show the positions of works whereby a decision is made as to whether the picking is appropriate or not. That is, when the work inclination (gradient) angle is θ2 as illustrated in FIG. 10B, the work W cannot be picked by the hand 40 of the picking robot 30. On the other hand, when the work inclination angle is below θ1 as illustrated in of FIG. 10A, the work W can be picked thereby. This work inclination angle θ1 is set as a limit value for the specific portion of the work W. A second collation limit value of the collative model based on the inclination limit value θ1 which is capable of hold a specific portion, i.e., a circular hole portion, of the work W is the tolerance σ2. Taking into account the safety factor, the limit value θ1 is set to an angle slightly smaller than the work inclination angle θ that the picking success probability is 100%. As illustrated in FIG. 11, the picking success probability of the work specific portion with respect to the work inclination angle θ can be obtained experimentally. As seen from the illustration, when the work inclination angle θ increases up to about 50°, the number of the works W recognized increases. On the other hand, when the work inclination angle θ exceeds about 35°, the picking success probability gradually decreases from 100%. That is, although the conventional picking object range is a small region that the work inclination angle θ is below about 10° which is able to be recognized as a substantial circle, in this invention the picking object range can be enlarged up to about 35° with an ellipse being recognized as a circle.

Returning again to FIG. 8, if $|r_m - r_o| < \sigma 2$ in the step 214, a step 216 follows to transmit the central coordinate Gm, obtained in the step 210, to the picking robot 30 side under the decision of the collation success, thereafter terminating this program. On the other hand, if the decision of the step 208 or 214 is "NO", a step 218 follows to erase the line segment data from the storage area A, then returning to the step 204 to perform the similar processes. Further, if the decision of in the step 204 is that the serial line segment group is gone so that the storage area A becomes empty, this program is ended.

In this program, the steps 206 and 208 act as a specific portion detecting means, the steps 210 to 214 act as a position determining means, and the step 216 acts as a command means.

By executing the above-described program, a work W is picked up by the hand 40 of the picking robot 30 on the basis of the central coordinate Gm initially recognized in correspondence with the work specific portion. Here, it is also appropriate that, as a different picking method, the central coordinate Gm of the specific portion, taking the smallest inclination position to be suitable for the picking, of a plurality of specific portions recognized from the entire two-dimensional image inputted from the image inputting camera 10 is calculated and transmitted to the robot side. In this case, even if a long time is taken for the recognition of the specific portion, it is possible to further improve the picking success probability.

Figure 12A:
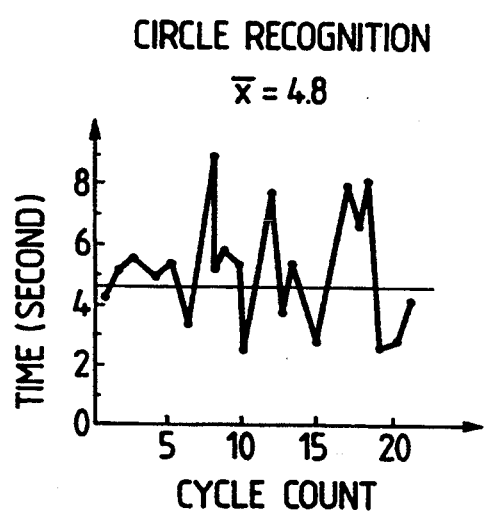
FIGS. 12A and 12B are illustrations for describing cycle times for circle and ellipse recognition.
Figure 12B:
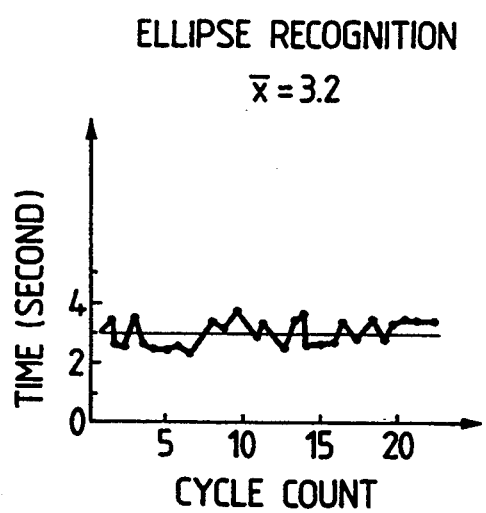

FIGS. 12A and 12B show the confirmation results of the cycle times in the circle recognition and ellipse recognition. FIG. 12A shows the necessary time (second) at every circle recognition and FIG. 12B shows the necessary time (second) in the ellipse recognition. Since the stacked part high-speed picking system according to this invention performs the ellipse recognition which allows an ellipse to be recognized as a circle, the picking repetition necessary time can be reduced up to 2.2 to 3.8 seconds (30 seconds in average) unlike the conventional circle recognition taking 2.7 to 9.0 seconds (4.8 seconds in average). Further, as seen from the illustrations, it is possible to considerably reduce the variation of the necessary time.

Although in the above-described embodiment parts with holes whose configurations are circles are picked up, it is also possible to pick up different parts such as parts with parallel portions and parts with pins by the similar operation with simply shaped portions being limited and recognized as the specific portions. Further, although the object to be held by this embodiment is described as stacked parts, this embodiment is also applicable to one part independently placed on a plane, several parts scattered, and parts separately placed within a tray which is divided by partitions.

Figure 13:
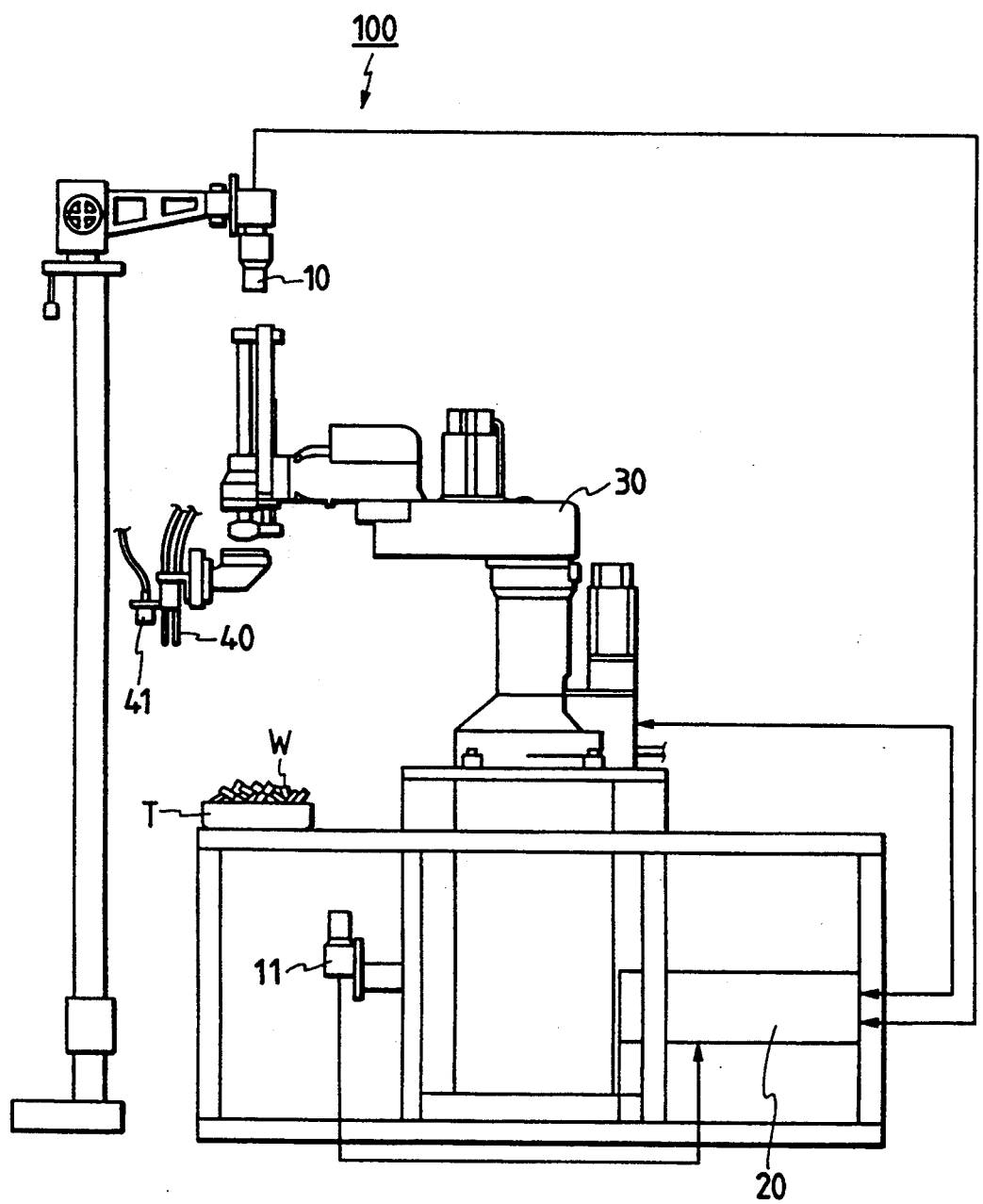
FIG. 13 shows the entire arrangement of a high-speed picking system according to an embodiment of this invention.
Figure 14:
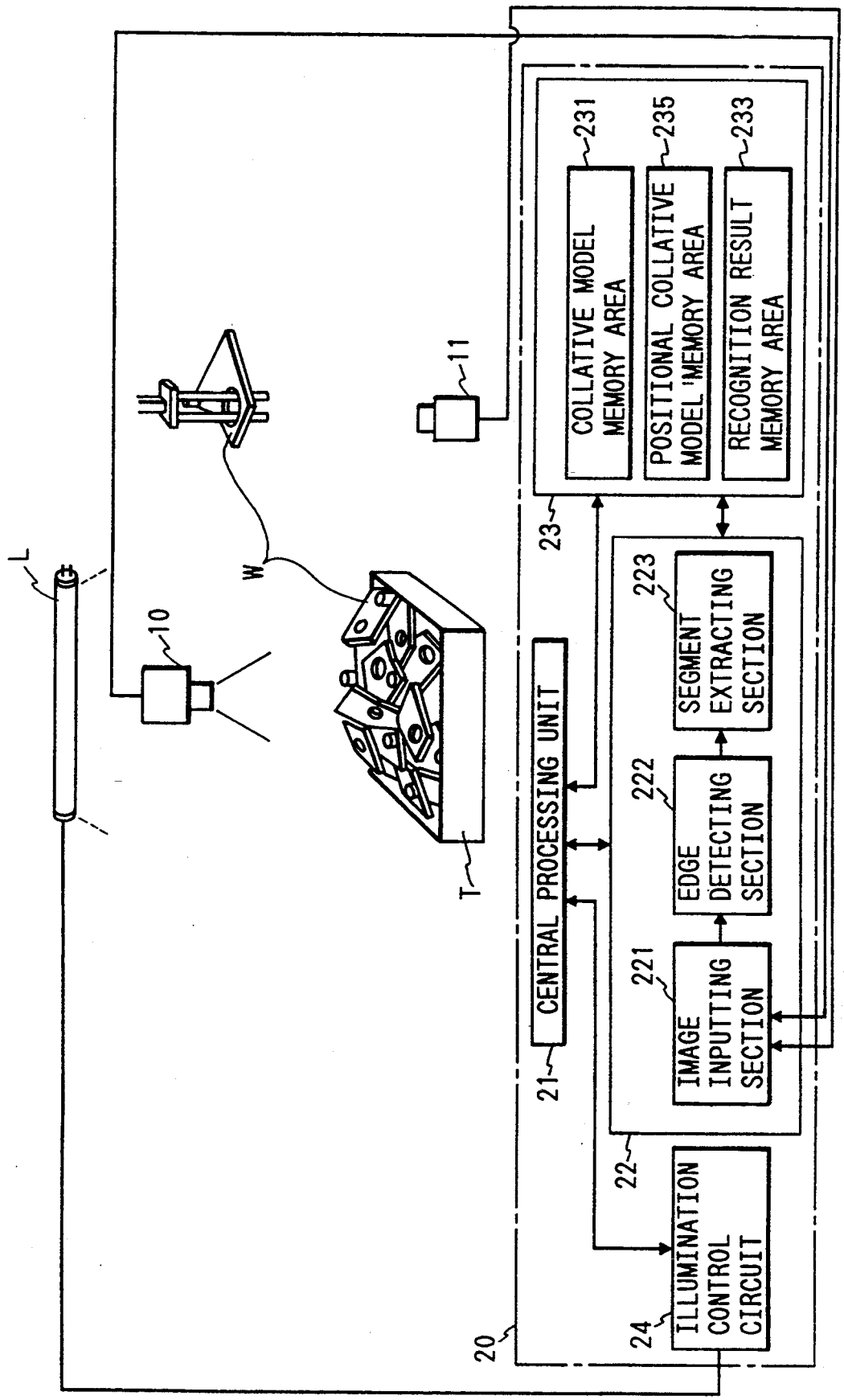
FIG. 14 is a block diagram showing an arrangement of a principal portion of the high-speed picking system depicted in FIG. 13.

Further, a description will be made hereinbelow with reference to FIGS. 13 and 14 in terms of an arrangement of a high-speed picking system according to a third embodiment of this invention. FIG. 13 shows the entire arrangement of the high-speed picking system and FIG. 14 shows an arrangement of a principal portion of the high-speed picking system, where parts corresponding to those in FIGS. 6 and 7 are marked with the same numerals and characters and the description thereof will be omitted for brevity. In FIGS. 13 and 14, in addition to an image inputting camera 10 for picking up an image of stacked works W within a tray T from the upper side of the stacked works W, another image inputting camera 11 is provided which picks up an image of a single work W, picked by a hand 40 of a picking robot 30, from the lower side of the picked work W. Here, if the image inputting camera 10 can be arranged additionally to pick up the image of the work W picked by the hand 40 of the picking robot 30 (tact time), it is possible to use only one image inputting camera. An illuminating device L is similarly disposed to evenly illuminate the works W from a position above the center of the tray T. This illuminating device L is arranged to evenly illuminate the single work W even when the work W is image.-picked up by the image inputting camera 11.

An object recognizing apparatus 20 similarly comprises a central processing unit 21, an image processing unit 22, a storage unit 23 and an illuminating control circuit 24. An image processing unit 22 similarly includes an image inputting section 221, an edge detecting section 222 and a segment extracting section 223. A storage unit 23 is constructed with RAMs or others and arranged to includes at least a collative model memory area 231 which acts as a collative model storage means to store a collative model set in advance on the basis of data specifying the configuration when a specific portion of a work W takes the basic position, a positional collative model memory area 235 which acts as a positional collative model storage means to store a positional collative model set in advance on the basis of data specifying the configuration when a work W takes a predetermined position, and a recognition result memory area 233 which stores the collation result of a line segment image corresponding to a number of stacked works W within a tray T.

Figure 15:
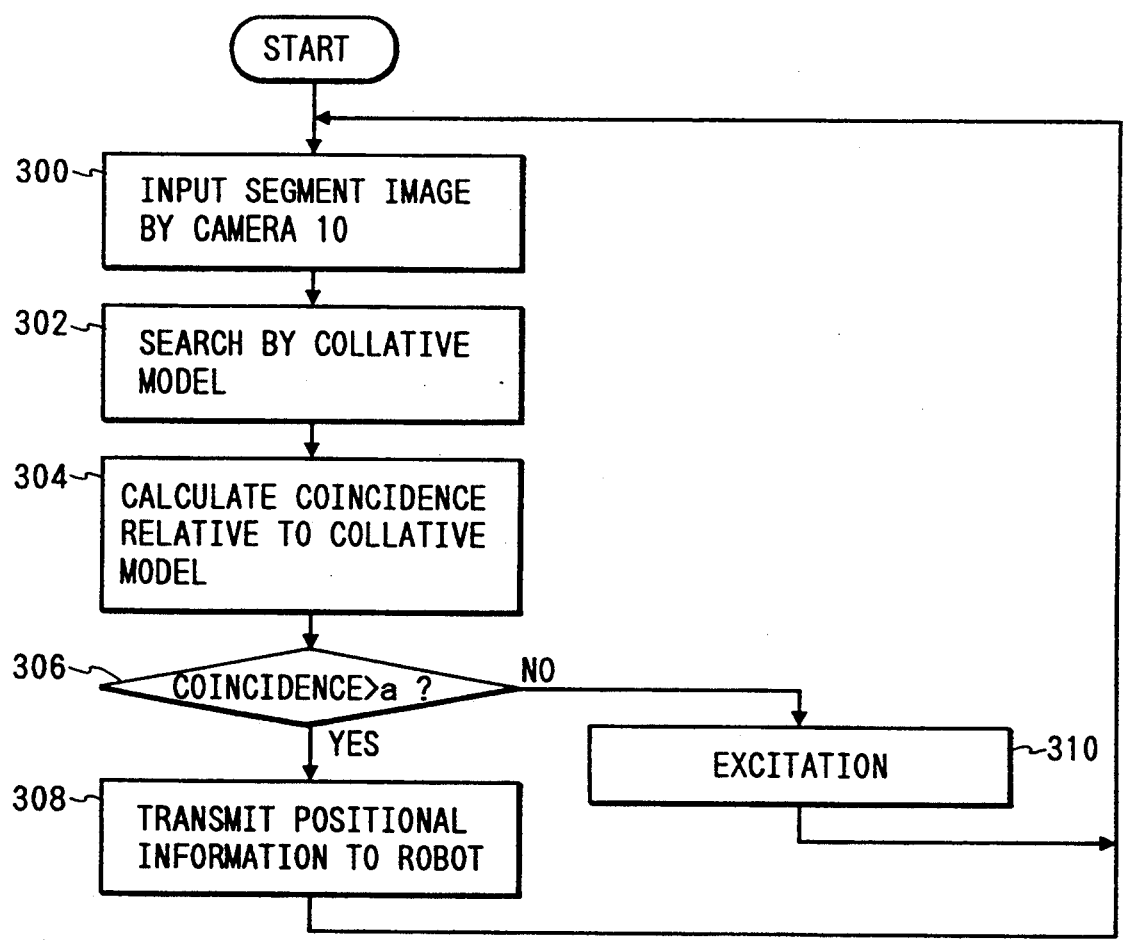
FIGS. 15 to 17 are flow charts showing a processing procedure of a central processing unit to be used in the system depicted in FIG. 13.
Figure 17:
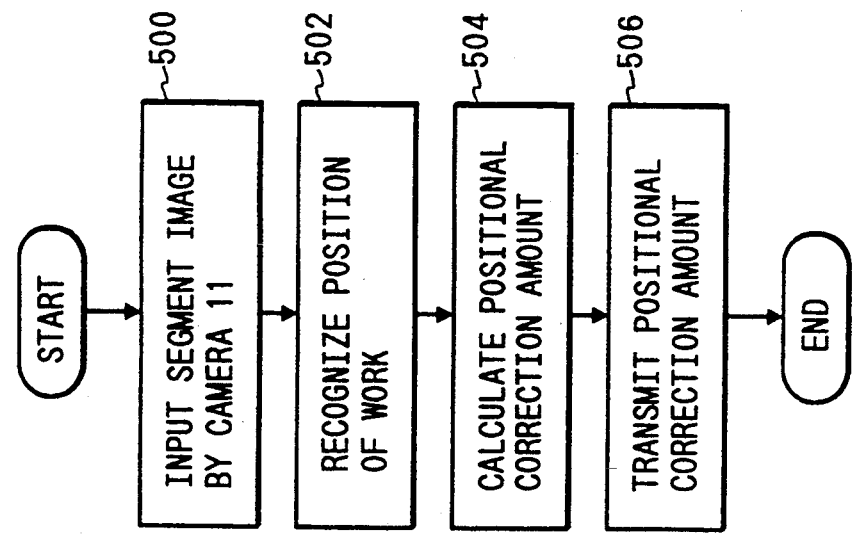
Figure 16:
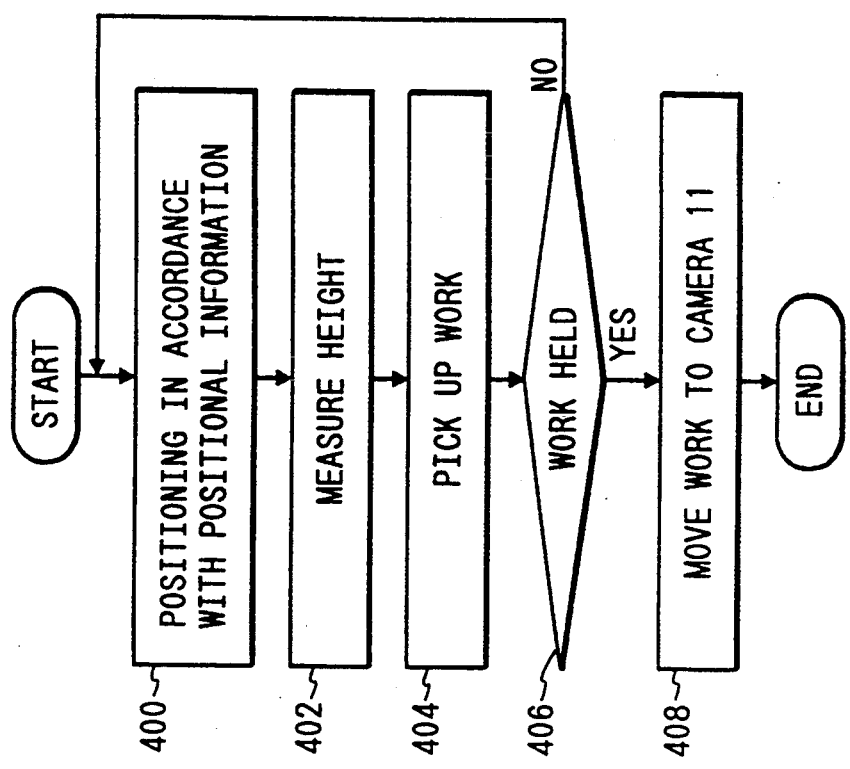

Secondly, an operation of this system will be described hereinbelow with reference to flow charts of FIGS. 15 and 17 showing a processing procedure of the object recognizing apparatus 20 and a flow chart of FIG. 16 showing a processing procedure of a control unit of the picking robot 30 side. Here, the description will be made in terms of the case that, for example, a circle is selected as a specific portion from the various constitutive line segments and collated with a collative mode "circle" after the input of the video signal of a number of stacked works W from the image inputting camera 10 and the extraction of constitutive line segments and further in terms of the case that a video signal of a single work W held by the hand 40 of the picking robot 30 is inputted from the image inputting camera 11 to extract constitutive line segments so as to correct the position of the work W.

First, in the object recognizing apparatus 20, in response to the turning-on of the illuminating device L due to an illumination control circuit 24, a video signal of stacked works W within the tray T, obtained by the image inputting camera 10, is inputted to the image inputting section 221 so as to sample and convert the video signal into a digital signal to produce a gray scale image. This gray scale data is inputted to the edge detecting section 222 to be differentiated to produce an edge image. This edge image is inputted to the segment extracting section 223 to trace the ridge line to extract the border line of the object. Further, the border line is approximated by a kinked line, a circle or the like so as to obtain a line segment image.

In a step 300 of FIG. 15, the central processing unit 21 inputs the line segment image obtained in the image processing unit 22. Then, a step 302 is executed to extract a serial line segment group from the inputted line segment image so that the extracted serial line segment group is searched by the collative model "circle" corresponding to the specific portion of the work W. Here, the collative model "circle" is set in advance on the basis of the data specifying the configuration when the work W takes the basic position, while the collation coincidence range is enlarged by the allowable limit angle or the like which allows holding the work W by the hand 40 of the picking robot 30 so that the search is effected even if the work W is in an inclined state. Further, a step 304 is executed to calculate the degree of the coincidence between the collative model "circle" used for the search in the step 302 and the specific portion of the work W searched. For example, in the case that the search is effected by the collative model "circle", since a circle is recognized as an ellipse when the work W is in an inclined state, this coincidence degree is expressed by the ratio of the major axis and minor axis of the ellipse.

Thereafter, a step 306 is executed to check whether there is a work W specific portion whose coincidence degree is greater than a value a. This value a is determined the above-mentioned allowable limit value or the like. If a number of work W specific portions each of which satisfies the aforementioned relation are recognized, the specific portion having the greatest coincidence degree is selected. If the answer of the step 306 is affirmative, a step 308 follows to transmit the positional information thereof to the picking robot 30 side. On the other hand, if the answer of the step 306, a step 310 follows to output an excitation command to an excitation device, not shown, so as to change the states of the stacked works W at the time of the next input of the line segment image to increase the recognition probability of the work W specific portions to be searched by the collative models.

After the positional information of the above-mentioned work W is received by the control unit of the picking robot 30, in a step 400 of FIG. 16, the hand 40 of the picking robot 30 is positioned on the basis of the positional information relating to the specific portion of the work W. Then, a step 402 is executed to measure the height of the hand 40 with respect to the specific portion of the work W by means of a distance detecting sensor disposed near the hand 40, designated at numeral 41 in FIG. 13, so as to detect the distance relative to the specific portion of the work W. Further, a step 404 is executed to hold the specific portion of the work W by the hand 40 of the picking robot 30 to pick up the work W, then followed by a step 406 to decide whether the work W is held. This decision can be made by detecting the moving amount of the tip portion of the hand 40 through a limit switch, a magnetic scale or the like. If the work W is held in the step 406, a step 408 follows to move the the work W, held by the hand 40 of the picking robot 30, up to the image pickup position above the image inputting camera 11, thereafter terminating this program.

When a signal indicative of the fact that the work W is moved up to the image pickup position of the image inputting camera 11 as described above is received by the object recognizing apparatus 20, the illumination control circuit 24 turns on the illuminating device L and a video signal corresponding to the single work W obtained by the image inputting camera 11 is inputted to the image inputting section 221. In the image inputting section 221, the video signal is sampled to be converted into a digital signal to produce a gray scale image. This gray scale image data is inputted to the edge detecting section 222 to be differentiated to produce an edge image. This edge image data is inputted to the segment extracting section 222 to trace the ridge line to extract the border line of the object. Further, this border line is approximated by a kinked line, a circle or the like so as to obtain a line segment image.

In a step 500 in FIG. 17, the central processing unit 21 inputs the line segment image obtained by the image processing unit 22. Then, a step 502 is executed to perform the collation between the inputted line segment image and the positional collative model to recognize the position of the work W. Here, with the above-described processes, the work W is held by the hand 40 of the picking robot 30 so that a circular hole, i.e., the specific portion, is kept to take a position due to one degree of freedom. Accordingly, in the step 502, for the position recognition of the work W, the positional collative model is rotated to be coincident with the line segment image of the work W.

Further, a step 504 is executed to calculate a position correction amount which is a deviation in the rotational direction and angle in the step 502, then followed by a step 506 to transmit the position correction amount calculated in the step 504 to the picking robot 30 side, thereafter terminating this program.

Here, the steps 302 and 304 act as a specific portion detecting means, the step 306 acts as a position determining means, the step 308 acts as a picking command means, the steps 502 and 504 act a correction amount calculating means, and the step 506 acts as a position correction command means.

FIG. 18 shows the basic steps of picking operations for stacked multi-shaped parts. Although in the above-described embodiment parts with holes whose configurations are circles are picked up, it is also possible to pick up different parts such as parts with parallel portions and parts with pins by the similar operation with simply shaped portions being limited and recognized as the specific portions. Further, although the object to be held by this embodiment is described as stacked parts, this embodiment is also applicable to one part independently placed on a plane, several parts scattered, and parts separately placed within a tray which is divided by partitions.

Figure 19A:
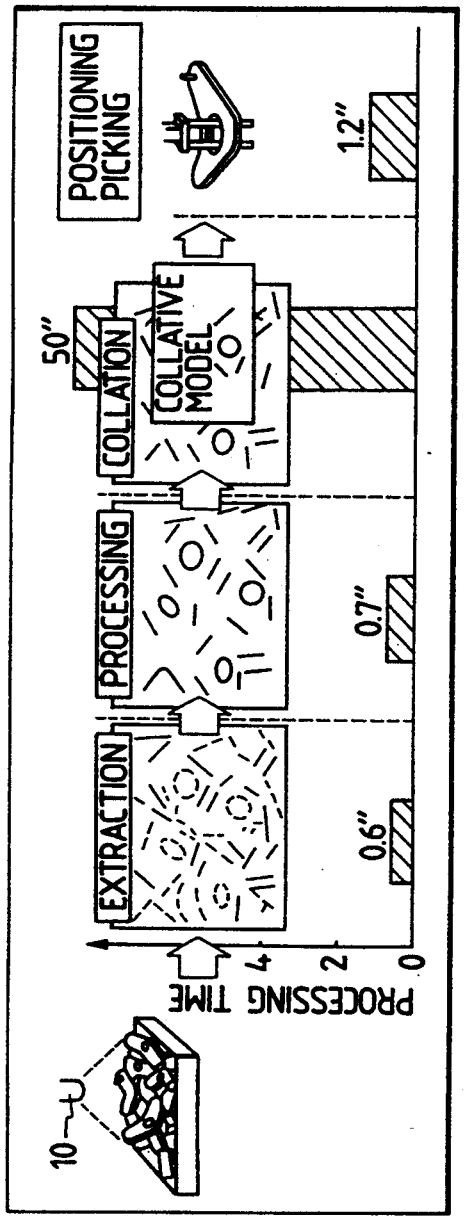
FIGS. 19A and 19B are illustrations for describing the steps used and time spent in the picking of one part from among stacked parts.
Figure 19B:
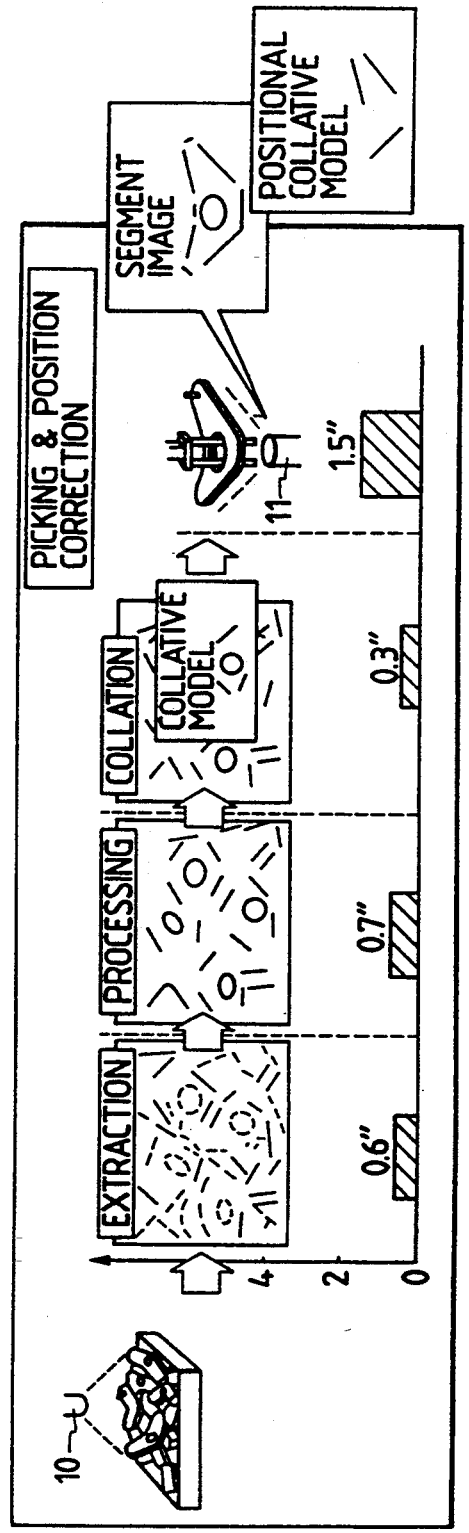

FIGS. 19A and 19B are illustrations for describing the steps and the necessary times in the case of recognizing and picking one of stacked parts. FIG. 19A shows the case of using one collative model in accordance with a conventional technique and FIG. 19B shows the case of using the collative model and the positional collative model according to this invention. In the collation steps, if the collative model is "circle" corresponding to a specific portion of a part having a simple configuration, the probability of recognizing the specific portion becomes high so that the necessary time for the collation extremely becomes short. Further, In the conventional technique, after the collation step, the hand of the picking robot is immediately positioned so that the part is picked by the hand. On the other hand, according to this invention, after the part is picked up by the hand of the picking robot, the position correction is required to be made on the basis of the positional collative model. Accordingly, this invention increases the number of the steps, while the position collation for one part picked can be achieved for an extremely short time whereby the time necessary for the picking and position correction is not so much as that of the conventional technique. That is, according to this invention, it is possible to extremely heighten the picking success probability that one part is picked up from stacked parts, and further possible to considerably shorten the necessary time as compared with the conventional technique.

Figure 20A:
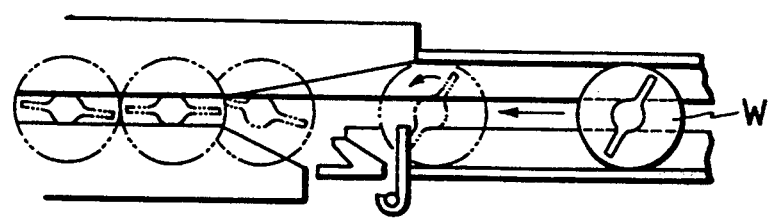
FIGS. 20A to 20C are illustrations for describing other position correcting methods for picking one part from among stacked parts.
Figure 20B:
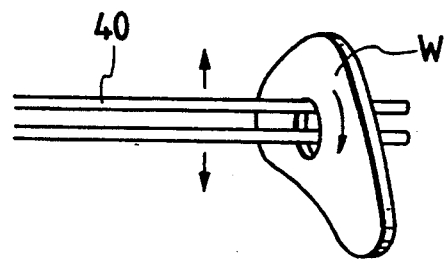
Figure 20C:
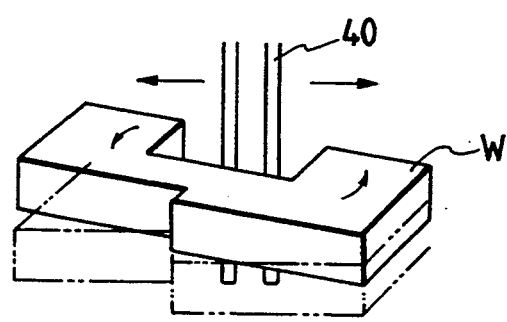

FIGS. 20A to 20C are illustrations for other methods of picking up one part from stacked parts to perform the position correction. FIG. 20A shows a copy correction due to a guide where a part whose a specific portion is picked up is placed on a predetermined guide to determine its direction. FIG. 20B shows a correction utilizing the center of gravity where the direction of a part whose a specific portion is picked up is determined by the tare weight. FIG. 20C shows an inclination natural correction due to a parallel hand where the direction of a part is determined by a hand which displaces in parallel when picking up a specific portion. In the aforementioned methods, the specific portion of the work W is limited and recognized by the image inputting camera 10 and, in the state that the specific portion is picked up, the position recognition is effected by the image inputting camera 11 and the position correction is effected.

Here, there is a case that the position correction can mechanically be effected in place of the image processing due to the image inputting camera 11 after the picking. That is, if a work W allows the position corrections as shown in FIGS. 20A to 20C, it is not always required to take the step procedure that the image processing due to the image inputting camera 11 is effected to perform the position correction after the picking of the specific portion. In this case, the image processing due to the image inputting camera 11 is used only for confirming, on the basis of the positional collative model, whether the mechanical position correction is adequately completed.

According to this embodiment, a portion of a two-dimensional image of stacked parts which is recognized by the collation relative to a collative model is detected as a specific portion to determine the position of the detected specific portion so as to supply the robot side with a picking command whereby the hand of the robot is positioned at the position of the specific portion to pick up the specific portion. Further, the two-dimensional image of the single part picked up through the specific portion is collated with a positional collative model so as to calculate the position correction amount which is the deviation between the position of the picked part and the positional collative model and correct the position of the part on the basis of the calculated position correction amount. By performing the collation relative to the collative model corresponding to the part specific portion having a simple configuration, the time necessary for the collation becomes extremely short and the specific portion recognizing probability becomes extremely high. Further, since the specific portion is at once picked up by the hand of the robot, it is possible to considerably improve the picking success probability. In addition, since the part is picked up and the position of the part picked up is corrected to a predetermined state, in the high-speed picking system for stacked parts according to this invention, although the processing time for picking one part becomes the sum of the time required for picking the specific portion of the part and the time required for taking a predetermined position after the picking of the part, the respective times are short so that the processing time can extremely be reduced as compared with that of the conventional technique.

Still further, a description will be made hereinbelow with reference to FIG. 21 in terms of a high-speed picking system according to a fourth embodiment of this invention. The entire arrangement of this high-speed picking system is similar to the entire arrangement of the above-described second embodiment in FIG. 6. FIG. 21 shows an arrangement of a principal portion of the fourth embodiment of this invention where parts corresponding to those in FIGS. 2, 7 and 14 are marked with the same numerals and characters and the description thereof will be omitted for brevity. In FIG. 21, an object recognizing apparatus 20 similarly comprises a central processing unit 21, an image processing unit 22, a storage unit 23 and an illuminating control circuit 24. The image processing unit 22 similarly includes an image inputting section 221, an edge detecting section 222 and a segment extracting section 223. On the other hand, the storage unit 23 is constructed with RAMs or others and arranged to includes at least a collative model memory area 231 which acts as a collative model storage means to store a collative model set in advance on the basis of data specifying the configuration when a specific portion of a work W takes the basic position, a picking portion memory area 236 which acts as a picking portion storage means to store a picking portion clearly having a quantitative relative positional relation to a specific portion, and a recognition result memory area 233 which stores the collation result of a line segment image corresponding to a number of stacked works W within a tray T.

Figure 23:
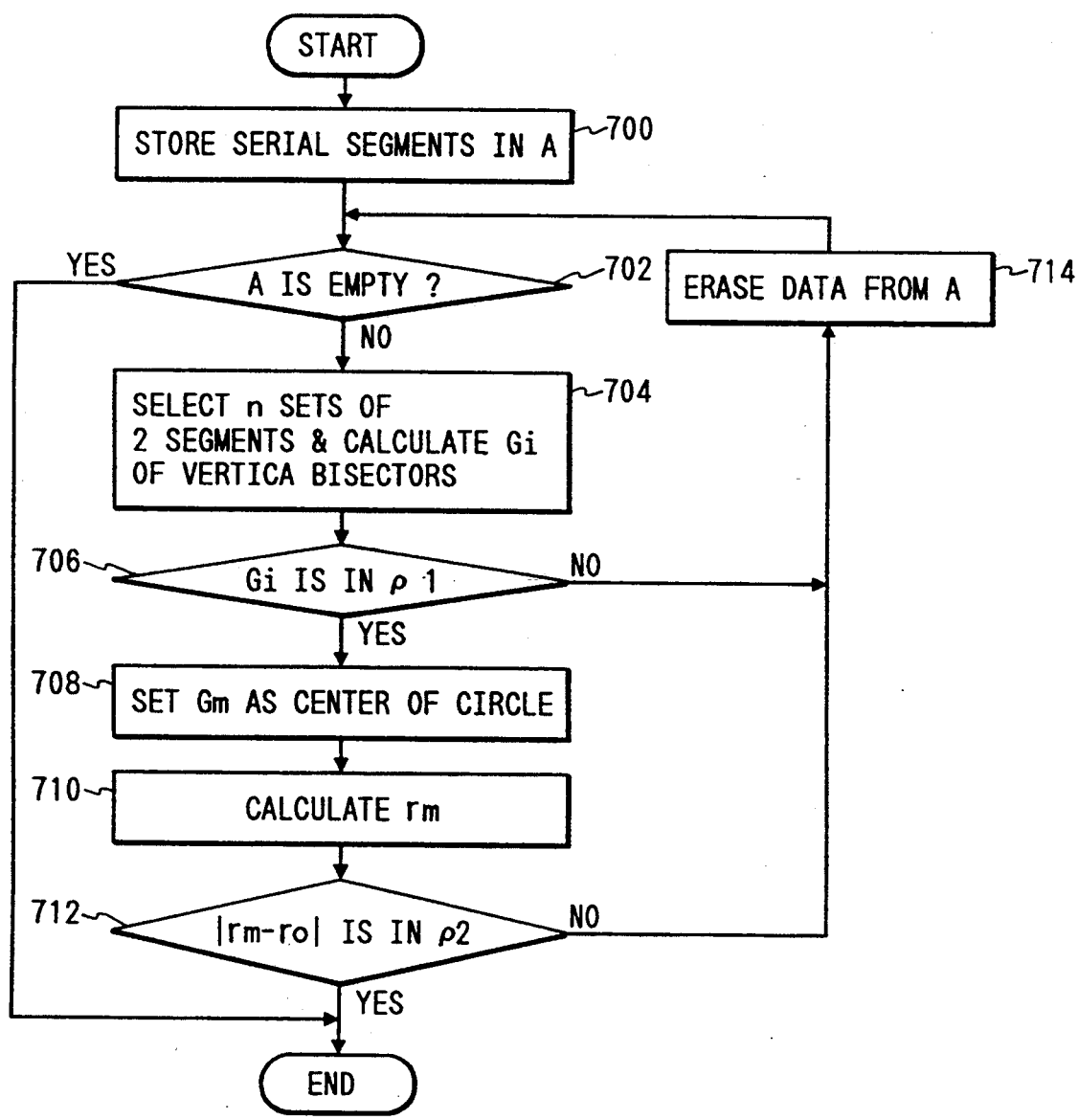
Figure 24:
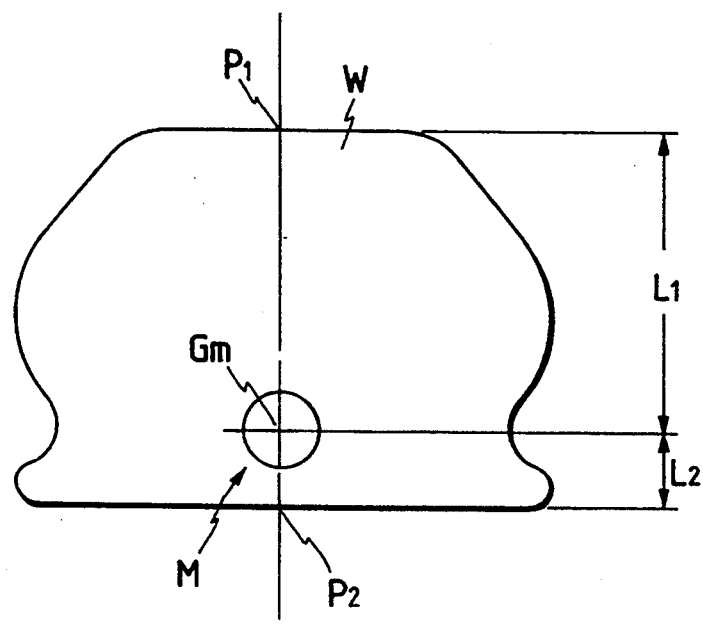
FIG. 24 is a plan view showing a work having a printed mark thereon.

Secondly, an operation of this system will be described hereinbelow with reference to flow charts of FIGS. 22 and 23 in terms of the case that a mark portion such as a mark printed in advance on a work W is used as a specific portion having a simple configuration to allow a visual recognition from various constitutive line segments and selectively collated with a collative model "mark" after the input of a video signal of a number of stacked works W from an image inputting camera 10 and the extraction of the constitutive line segments therefrom. Here, as illustrated in FIG. 24, on a plate-like work W there is provided a mark comprising a circle and a vertical line whose one end extends up to the outside of the circle. That is, the collative model "mark" is arranged such that the direction of the work W can be confirmed (able to confirm whether the work W turns to the upside, lowerside, right side or left side). it is not appropriate to use as the mark a figure such as a circle which does not allow the confirmation of the direction.

In response to the turning-on of the illuminating device L due to an illumination control circuit 24, a video signal obtained by the image inputting camera 10 is inputted to the image inputting section 221 so as to sample and convert the video signal into a digital signal to produce a gray scale image. This gray scale data is inputted to the edge detecting section 222 to be differentiated to produce an edge image. This edge image is inputted to the segment extracting section 223 to trace the ridge line to extract the border line of the object. Further, the border line is approximated by a kinked line, a circle or the like so as to obtain a line segment image.

In a step 600 of FIG. 122, the central processing unit 21 inputs the line segment image obtained in the image processing unit 22. Then, a step 602 is executed to perform the search processing on the basis of the collative model "mark" corresponding to the mark portion M of the work W. In the operation of the step 602, as shown by a sub-program of FIG. 23, in a step 700, a serial line segment group of the line segment image inputted is stored in a storage area A of the central processing unit 21. Then, a step 702 is executed to check whether the storage area A is empty, that is, whether the serial line segment group, i.e., the collation object, remains within the storage area A. In the initial execution cycle, since the storage area A is not empty in the case that the serial line segment group is successively extracted, the operation advances to a step 704. In the step 704, n sets of two line segments are selected from the serial line segment group within the storage area A so as to calculate the intersections Gi (i=1, 2, ..., n) of the vertical bisectors thereof. As illustrated in FIG. 9A, if the serial line segment group is close to a circle, the coordinates of the intersections of the vertical bisectors of the n sets of two line segments (l1 and l2, l3 and l4, l5 and l6, ...) are substantially coincident with each other so as to be G0. On the other hand, if the serial line segment group forms an ellipse, the coordinates of the intersections of the vertical bisectors of the n sets of two line segments (l1 and l2, l3 and l4, l5 and l6, ...) are not coincident with each other so as to be G1, G2, G3, ..., Gn.

Returning again to FIG. 23, a step 706 is then executed to check whether all the maximum distance values between the optional two points of the intersections Gi (i=1, 2, ..., n) obtained in the step 704 are in a predetermined tolerance $\sigma 1$ for the collative model. That is, the serial line segment group is checked as to whether being essentially a circle. In the FIG. 9B case, the aforementioned tolerance $\sigma 1$ is the hatched portion of a circle indicated by a dotted line and is indicative of the collation limit value which allow the collation relative to the collative model in the case that a circular hole which is a specific portion of a work W is inclined to be an ellipse. In the step 706, all the intersections G1 (i=1, 2, ..., n) are within the tolerance $\sigma 1$, a step 708 follows to calculate the average (G1, G2, ..., Gn)/n of the intersections Gi (i=1, 2, ..., n) so as to obtain the central coordinate Gm.

Thereafter, a step 710 is executed to calculate the average of the distances between the central coordinate Gm obtained in the step 708 and the respective line segments selected in the step 704 so as to obtain a radius $r_m$. Then, a step 712 follows to check whether the deviation $|r_m - r_o|$ relative to the radius $r_o$ of the circle of the collative model "mark" stored in the collative model memory area 231 of the storage unit 23 is in a predetermined tolerance $\sigma 2$.

Here, FIGS. 25A and 25B show the positions of works whereby a decision is made as to whether the picking is appropriate or not. That is, when the work inclination angle is $\theta 2$ as illustrated in of FIG. 25B, the work W cannot be picked by the hand 40 of the picking robot 30. On the other hand, when the work inclination angle is below $\theta 1$ as illustrated in FIG. 25A, the work W can be picked thereby. This work inclination angle $\theta 1$ is set as a limit angle for the specific portion of the work W. A collation limit value for the collative model based on the inclination limit angle $\theta 1$ which is capable of hold a a parallel end surface portion, i.e., the picking portion of the work W, is the tolerance $\sigma 2$. Taking into account the safety factor, the limit value $\theta 1$ is set to an angle slightly smaller than the work inclination angle $\theta$ that the picking success probability is 100%. The picking success probability of the picking portion of the work W with respect to the work inclination angle $\theta$ can be obtained experimentally.

Here, if the decision of the step 706 and step 712 is "NO", the operation goes to a step 714 to erase the line segment data from the storage area A, thereafter returning to the step 702 to perform the same processes.

Figure 22:
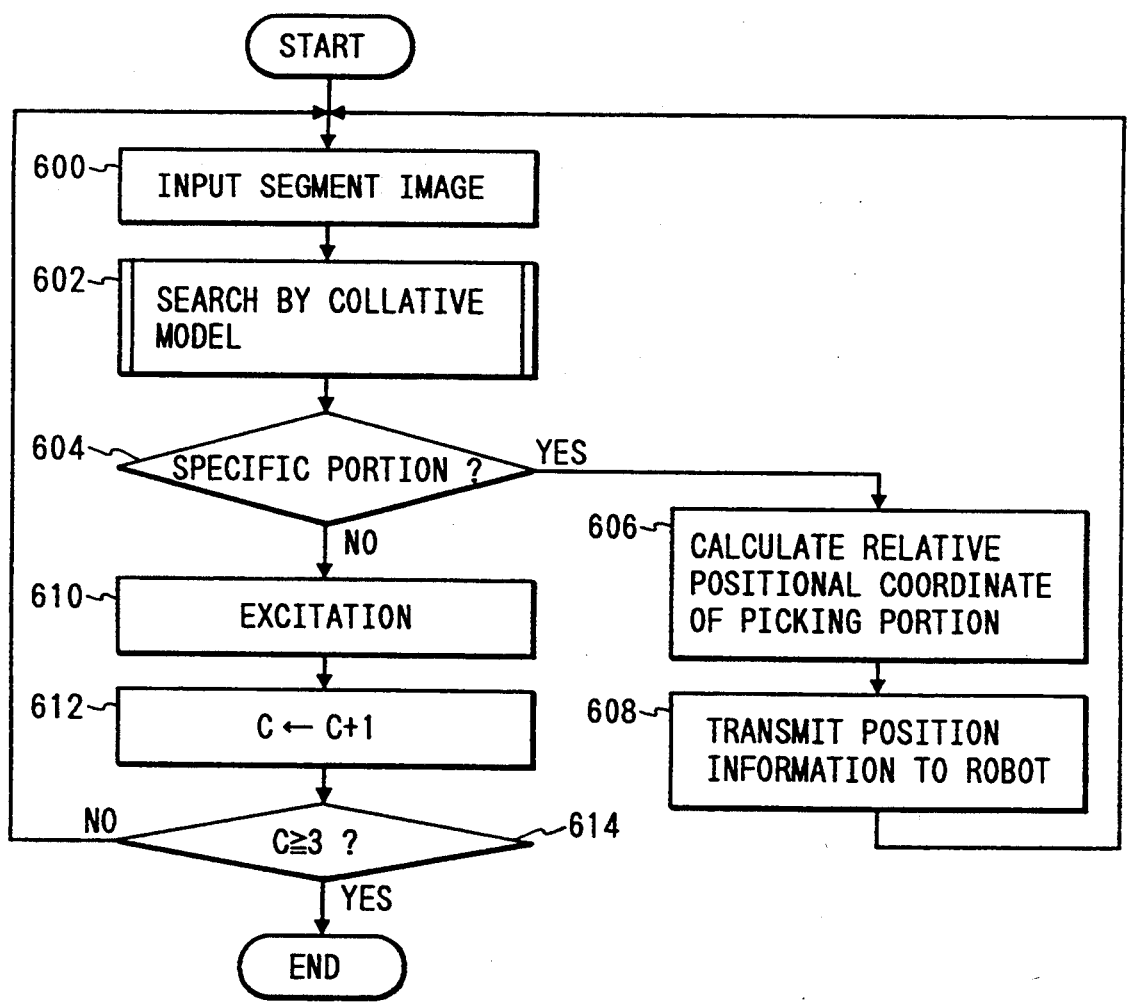
FIGS. 22 and 23 are flow charts showing a processing procedure to be executed by a central processing unit in the system depicted in FIG. 21.

If in the step 702 the serial line segment group is gone so that the storage area A becomes empty, the operation goes to a step 604 in FIG. 22. In the step 604, it is checked whether there is the mark portion M which is the specific portion of the work W. If the mark portion M satisfying $|r_m - r_o| < \sigma 2$ exists in the step 712, the operation advances to a step 606. Here, in the case that a number of mark portions M satisfying the aforementioned relation are recognized, the mark portion M having the smallest $|r_m - r_o|$ value is selected.

The step 606 is for calculating the relative positional coordinate of the picking portion on the basis of the central coordinate Gm of a circle or an ellipse of the recognized mark portion M. As illustrated in FIG. 24, the picking portion corresponds to the positions P1 and P2 of the parallel end surfaces separated by distances L1 and L2 from the central coordinate Gm of the mark portion M when the work W takes the horizontal position. Here, the positional information to be transmitted to the picking robot 30 side are the picking direction of the corresponding hand 40, which is the direction of the vertical line in the circle or ellipse caused by the recognition of the mark portion M, and the picking central coordinate. The central coordinate on the picture plane is converted into the central coordinate on the real space and transmitted to the picking robot 30 side.

As described above, the distance from the central coordinate Gm of the mark portion M (the mark comprising a circle and a vertical line whose one end extends up to the outside of the circle) to one relative position P1 of the portion picked by the hand 40 of the picking robot 30 is L1 and the distance to the other relative position P2 is L2, and this quantitative relative positional relation is stored in the picking portion memory area 236 of the storage unit 23. Thus, the picking central position is the position separated by $|(L1-L2)/2| \times COS\theta$ from the central coordinate Gm of the mark portion M in the direction that the vertical line protrudes from the circle or ellipse of the mark portion M. The above-mentioned work inclination angle $\theta$ is obtained on the basis of the length of the minor axis of the ellipse or circle of the mark portion M. That is, if the major axis and minor axes of the mark portion M are equal in length to each other (circle), $\theta = 0°$. On the other hand, if the major and minor axes are different in length from each other (ellipse), $\theta$ is obtained in accordance with the following equation.

$$\theta = COS^{-1}\{(\text{the length of the minor axis})/(\text{the length of the major axis})\}$$

Thereafter, a step 608 is executed to transmit the positional information of the picking portion of the work W.

On the other hand, if the decision of the step 604 is absence of the mark portion M, a step 6110 is executed to output an excitation command for the excitations of the tray T to an excitation device, not shown, so as to change the states of the stacked works W at the time of the next input of the image to improve the collative model-based search probability. Then, a step 612 is executed to count the number of the excitations. This excitation count is set to 0 in the start of the program, and increased whenever one search due to the collative model ends in failure. In the subsequent step 614, it is checked whether the excitation count $C \geq 3$. That is, if the state of the works W is not changed irrespective of 3 excitations so that the 3 searches due to the collative model end in failure, a decision is made such that the work W within the tray T is gone or the existing states of the works W are very bad so as not to be suitable for a further execution of the search, thereby terminating this program.

Here, the steps 602 and 604 act as a specific portion detecting means, the step 606 acts as a position determining means, and the step 608 acts as a command means.

With the above-described program, the picking portion corresponding to the mark portion M of the work W can be picked up by the parallel movable hand 40 of the picking robot 30. Thus, in the high-speed picking system according to this embodiment, since the collation is effected with respect to the specific portion of the work W which allows the visual recognition, the time for collation can extremely be reduced. Further, because of picking the picking portion which is easily held and which clearly has the quantitative relative positional relation to the specific portion, the picking success probability becomes high. In addition, since the specific portion is different from the picking portion, it is possible to pick up the work W even if the specific portion is small to make it difficult to hold it by the hand 40 of the picking robot 30.

Further, although the objects to be held according to this embodiment are stacked parts, this embodiment is also applicable to one part independently placed on a plane, several parts scattered, and parts separately placed within a tray which is divided by partitions.

It should be understood that the foregoing relates to only preferred embodiments of the present invention, and that it is intended to cover all changes and modifications of the embodiments of the invention herein used for the purposes of the disclosure, which do not constitute departures from the spirit and scope of the invention.

What is claimed is:

1. A stacked-part high-speed picking system for obtaining border lines of stacked parts from a two-dimensional image, for extracting a plurality of constitutive line segments from said border lines, and for recognizing said stacked parts on the basis of said constitutive line segments so that said stacked parts are picked up by a robot, said picking system comprising:

means for storing a plurality of collative models, each based upon data specifying a configuration when a plurality of specific portions of said stacked parts are disposed in one of a plurality of basic positions, said plurality of collative models representing said plurality of specific portions so as to allow recognition of said plurality of specific portions in said two-dimensional image, each of said plurality of specific portions having a simple shape, which allows said stacked parts to be picked up by said robot;

means for storing a collation limit value which is based upon an inclination limit angle of said plurality of specific portions relative to each of said basic positions, said inclination limit angle defining a range that allows a selected one of said plurality of specific portions to be picked by said robot and indicating an allowable non-coincidence range between said selected specific portion and a corresponding one of said collative models;

specific portion detecting means for detecting, as said selected specific portion, a portion of said two-dimensional image which is within said allowable non-coincidence range and which is recognized in accordance with said collative models;

means for determining a position of said detected selected specific portion; and command means for positioning said robot at said determined position of said detected selected specific portion so as to allow said robot to pick up said selected specific portion.

2. A picking system as recited in claim 1, further comprising means for changing a state of said stacked parts when said selected specific portion is not recognized by said specific portion detecting means.

3. A picking system as recited in claim 1, wherein one of said plurality of collative models is based upon data that specifies a circular configuration when one of said plurality of specific portions is in one of said basic positions.

4. A picking system as recited in claim 1, wherein one of said plurality of collative models is based upon data that specifies a configuration including line segments that are parallel and equal in length to each other when one of said plurality of specific portions is in one of said basic positions.

5. A picking system as recited in claim 1, wherein one of said plurality of collative models is based upon data that specifies a configuration including line segments that are parallel to each other and of different lengths when one of said plurality of specific portions is in one of said basic positions.

6. A picking system as recited in claim 1, wherein;
one of said plurality of collative models is based upon data that specifies a circular configuration when one of said plurality of specific portions is in one of said basic position; and
said collation limit value is based upon a difference between a radius of said circular configuration when one of said plurality of specific portions is in one of said basic positions and a radius of a substantial circular configuration when one of said plurality of specific portions is in an inclined position.

7. A picking system as recited in claim 1, wherein:
said robot includes a plurality of hands; and
said command means positions one of said plurality of hands at the determined position of said detected selected one of said plurality of specific portions so as to allow said robot to pick up said selected one of said plurality of specific portions.

8. A stacked-part high-speed picking system for obtaining border lines of stacked parts from a two-dimensional image, for extracting a plurality of constitutive line segments from said border lines, and for recognizing said stacked parts on the basis of said constitutive line segments so that said stacked parts are picked up by a robot, said picking system comprising:
means for storing a plurality of collative models, each based upon data specifying a configuration when a specific portion of said stacked parts is disposed in one of a plurality of basic positions, said collative models representing said specific portion so as to allow recognition of said specific portion in said two-dimensional image, said specific portion having a simple shape, which allows for visual recognition of said specific portion;
collation limit value storage means for storing a collation limit value, which is based upon an inclination limit angle of said specific portion relative to each of said basic positions, said inclination limit angle defining a range that allows said specific portion to be picked up by said robot and indicating an allowable non-coincidence range between said specific portion and said plurality of collative model sets;
means for storing a positional collative model, which is based upon data specifying a configuration when one of said stacked parts is in a predetermined position;
specific portion detecting means for detecting, as said specific portion, a portion of said two-dimensional image which is within said non-coincidence range;
position determining means for determining a position of said detected specific portion;
command means for positioning said robot at said position determined by said position determining means so as to allow said robot to pick up one of said stacked parts;
means for calculating, when robot picks up only one of said stacked parts, a positional correction amount indicative of a deviation between a position of said picked up one of said stacked parts and said positional collative model; and
command means for correcting, based upon said positional correction amount, said determined position of said detected specific portion.

9. A picking system as recited in claim 8, wherein:
one of said plurality of collative models is based upon data that specifies a circular configuration when said specific portion is in one of said basic positions; and
in response to said command means, a positional correction is effected by a movement of a center of gravity of a tare weight of one of said stacked parts when said one of said stacked parts is picked up.

10. A picking system as recited in claim 8, wherein:
one of said plurality of collative models is based upon data that specifies a configuration including line segments that are parallel and equal in length to each other when said specific portion is in one of said basic positions; and
in response to said command means, a positional correction is effected by a movement of said robot when one of said stacked parts is picked up.

* * * * *